United States Patent
Tokui et al.

(10) Patent No.: US 9,646,383 B2
(45) Date of Patent: May 9, 2017

(54) IMAGE PROCESSING APPARATUS, IMAGE CAPTURING APPARATUS, AND DISPLAY APPARATUS

(71) Applicant: Sharp Kabushiki Kaisha, Osaka-shi, Osaka (JP)

(72) Inventors: Kei Tokui, Osaka (JP); Shigeaki Mizushima, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 440 days.

(21) Appl. No.: 14/365,123

(22) PCT Filed: Dec. 19, 2012

(86) PCT No.: PCT/JP2012/082909
§ 371 (c)(1),
(2) Date: Jun. 13, 2014

(87) PCT Pub. No.: WO2013/094635
PCT Pub. Date: Jun. 27, 2013

(65) Prior Publication Data
US 2014/0333726 A1   Nov. 13, 2014

(30) Foreign Application Priority Data

Dec. 19, 2011 (JP) ................................. 2011-277591
Dec. 22, 2011 (JP) ................................. 2011-281945
Dec. 22, 2011 (JP) ................................. 2011-282026

(51) Int. Cl.
*H04N 13/02* (2006.01)
*G06T 7/00* (2017.01)
(Continued)

(52) U.S. Cl.
CPC ........... *G06T 7/0055* (2013.01); *H04N 5/208* (2013.01); *H04N 9/68* (2013.01); *H04N 13/0018* (2013.01);
(Continued)

(58) Field of Classification Search
CPC ...... H04N 5/208; H04N 9/68; H04N 13/0018; H04N 13/0239; H04N 2013/0081;
(Continued)

(56) References Cited

U.S. PATENT DOCUMENTS 6,115,078 A * 9/2000 Kino ..................... H04N 1/4092
348/252
2008/0002910 A1   1/2008 Ojima et al.
(Continued)

FOREIGN PATENT DOCUMENTS

JP    9-200508 A    7/1997
JP    11-239364 A   8/1999
(Continued)

*Primary Examiner* — Sath V Perungavoor
*Assistant Examiner* — Xiaolan Xu
(74) *Attorney, Agent, or Firm* — Keating & Bennett, LLP

(57) ABSTRACT

An image processing apparatus includes an image processing intensity determination unit that determines an intensity of image processing and an image processing unit that performs the image processing to image information in accordance with the intensity determined by the image processing intensity determination unit. The image processing intensity determination unit determines the intensity of the image processing at a target pixel included in the image information on the basis of a depth value indicating a depth corresponding to the target pixel and a vertical position of the target pixel in the image information.

5 Claims, 23 Drawing Sheets

(51) Int. Cl.
*H04N 9/68* (2006.01)
*H04N 5/208* (2006.01)
*H04N 13/00* (2006.01)

(52) U.S. Cl.
CPC ............... *G06T 2207/10012* (2013.01); *G06T 2207/20192* (2013.01); *H04N 13/0239* (2013.01); *H04N 2013/0081* (2013.01)

(58) Field of Classification Search
CPC ............... G06T 7/0055; G06T 7/0061; G06T 2207/10012; G06T 2207/20192
See application file for complete search history.

(56) References Cited

U.S. PATENT DOCUMENTS

| | | | |
|---|---|---|---|
| 2009/0022396 A1* | 1/2009 | Watanabe | G06K 9/4633 382/167 |
| 2012/0162200 A1* | 6/2012 | Mishima | H04N 13/0022 345/419 |

FOREIGN PATENT DOCUMENTS

| | | |
|---|---|---|
| JP | 2005-136480 A | 5/2005 |
| JP | 2007-299144 A | 11/2007 |
| JP | 2008-21163 A | 1/2008 |
| JP | 2008-033897 A | 2/2008 |
| JP | 2009-38794 A | 2/2009 |
| JP | 2011-124712 A | 6/2011 |

* cited by examiner

B2

IMAGE PROCESSING APPARATUS, IMAGE CAPTURING APPARATUS, AND DISPLAY APPARATUS

TECHNICAL FIELD

The present invention relates to an image processing apparatus, an image capturing apparatus, and a display apparatus.

This application is based upon and claims the benefit of priority of the prior Japanese Patent Application No. 2011-277591 filed on Dec. 19, 2011, Japanese Patent Application No. 2011-281945 filed on Dec. 22, 2011, and Japanese Patent Application No. 2011-282026 filed on Dec. 22, 2011, the entire contents of which are incorporated herein by reference.

BACKGROUND ART

The following matters are known as first background art. In taking a still image or a movie with a camera or displaying the still image or the movie on a monitor, various image processing technologies have been developed in order to improve sharpness and clarity. For example, a contour enhancement process to improve the sharpness and a color saturation enhancement process to improve the clarity are exemplified as the image processing in related art. In addition, the image processing to adjust a sense of depth includes a method using depth data, for example, disclosed in PTL 1. In PTL 1, sense-of-depth correction gain is controlled using the depth data and a degree of depth to freely adjust the degree of the sense of depth. The depth data is acquired using an active method and a passive method. The active method includes Time Of Flight (TOF) in which infrared light is radiated to calculate a distance from reflected light. The passive method includes stereo cameras that perform matching using stereo images to calculate parallax.

However, the method disclosed in PTL 1 has a first problem in that, since accuracy and resolution in long-distance view are reduced when the depth data is acquired using the active method or the passive method, the adjustment in the long-distance view in accordance with the depth is disabled not to possibly provide the sense of depth. In the active method, the accuracy and the resolution depend on the irradiation intensity of the infrared light and all distances are at infinity in the long-distance view in which the reflected light of the infrared light cannot be detected to reduce the accuracy and the resolution. In the passive method in which the parallax is calculated with two cameras that are arranged in parallel, the parallax is inversely proportional to the distance and the parallax in the long-distance view is equal to zero to reduce the accuracy and the resolution.

In addition, the following matters are known as second background art. In taking a still image or a movie with a camera or displaying the still image or the movie on a monitor, various image processing technologies have been developed in order to improve the sharpness and the clarity of the still image or the movie. For example, the contour enhancement process to improve the sharpness, the color saturation enhancement process to improve the clarity, and image processing in which the depth data is used to adjust the sense of depth are known.

The control of the sense-of-depth correction gain using the depth data and the degree of depth by an image processing apparatus to adjust the degree of the sense of depth is disclosed in PTL 1. The depth data is acquired using the active method and the passive method. The active method includes the Time Of Flight (TOF) in which the distance to an object is calculated from reflected light of infrared light with which the object is irradiated. The passive method includes a method of calculating the parallax by the matching using stereo images that are taken by stereo cameras.

However, PTL 1 has a second problem in that, when the depth data is acquired using the active method or the passive method, the accuracy and the resolution in the long-distance view are reduced. For example, in the active method, since the accuracy and the resolution depend on the irradiation intensity of the infrared light, all distances are at infinity in the long-distance view in which the reflected light of the infrared light cannot be detected. In other words, the resolution of the depth is lost in the long-distance view in which the reflected light of the infrared light cannot be detected to disable accurate representation of the depth.

In contrast, in the passive method, when the parallax is calculated as an example of the depth data with two cameras that are arranged in parallel, the parallax is inversely proportional to the distance and the parallax in the long-distance view is equal to zero. In other words, the resolution of the depth is lost in the long-distance view to disable accurate representation of the depth. As a result, the image processing apparatus in the related art is not capable of performing the image processing corresponding to the depth in such long-distance view to cause a user not to sufficiently feel the depth.

Furthermore, the following matters are known as third background art. In taking a still image or a movie with a camera or displaying the still image or the movie on a monitor, various image processing technologies have been developed in order to improve the sharpness and the clarity. For example, the contour enhancement process to improve the sharpness and the color saturation enhancement process to improve the clarity are exemplified as the image processing in the related art. The image processing to adjust the sense of depth includes a method using the depth data. For example, the control of the sense-of-depth correction gain using the depth data and the degree of depth to freely adjust the degree of the sense of depth is disclosed in PTL 1.

In the image processing to adjust the sense of depth in accordance with the depth data, it is necessary to appropriately set the depth data and image processing parameters. FIG. 33 is a graph illustrating the relationship between the depth data and contour correction gain in PTL 1. As illustrated in FIG. 33, keeping the sense-of-depth correction gain constant against the variation in the depth data in an area in which the depth data has a value lower than a first depth value Z30 and an area in which the depth data has a value higher than a second depth value Z31 is disclosed in PTL 1.

However, there are a case in which only the depth data having a value lower than the first depth value Z30 exists or a case in which only the depth data having a value higher than the second depth value Z31 exists depending on the image. The image processing apparatus in PTL 1 has a third problem in that, since the image processing apparatus in PTL 1 is not capable of setting appropriate image processing parameters in these cases, it is not possible to adjust the sense of depth for the image to cause the user not to feel the depth.

CITATION LIST

Patent Literature

PTL 1: Japanese Unexamined Patent Application Publication No. 2008-33897

SUMMARY OF INVENTION

Technical Problem

In order to resolve the first problem, it is an object of the present invention to provide an image processing apparatus, an image capturing apparatus, and a display apparatus which are capable of generating an image having an improved sense of depth also in the long-distance view.

In order to resolve the second problem, it is an object of the present invention to provide an image processing apparatus, an image capturing apparatus, and a display apparatus which allow a user to feel the sense of depth.

In order to resolve the third problem, it is an object of the present invention to provide an image processing apparatus, an image capturing apparatus, and a display apparatus which are capable of generating an image for which the user feels the depth.

Solution to Problem (1) According to a first aspect of the present invention, the present invention provides an image processing apparatus including an image processing intensity determination unit that determines an intensity of image processing and an image processing unit that performs the image processing to image information in accordance with the intensity determined by the image processing intensity determination unit. The image processing intensity determination unit determines the intensity of the image processing at a target pixel included in the image information on the basis of a depth value indicating a depth corresponding to the target pixel and a vertical position of the target pixel in the image information.

(2) In the first aspect of the present invention, in a case in which the depth value corresponding to the target pixel is saturated, the image processing intensity determination unit may determine the intensity on the basis of the vertical position.

(3) In the first aspect of the present invention, the image processing apparatus may further include a vanishing point calculation unit that calculates a position of a vanishing point from the image information. The image processing intensity determination unit may determine the image processing intensity at an object pixel to be subjected to the image processing on the basis of a distance between the object pixel and the position of the vanishing point calculated by the vanishing point calculation unit.

(4) In the first aspect of the present invention, the image processing apparatus may further includes a depth information analysis unit that extracts information about frequency distribution of depth information corresponding to the image information on the basis of the depth information. The image processing intensity determination unit may determine the image processing intensity at each pixel in the image information on the basis of the information extracted by the depth information analysis unit and the depth information.

(5) According to a second aspect of the present invention, the present invention provides an image capturing apparatus including an imaging unit that captures an image of an object; an image processing intensity determination unit that determines an intensity of image processing; and an image processing unit that performs the image processing to image information generated by the imaging unit in accordance with the intensity determined by the image processing intensity determination unit. The image processing intensity determination unit determines the intensity of the image processing at a target pixel included in the image information on the basis of a depth value indicating a depth corresponding to the target pixel and a vertical position of the target pixel in the image information.

(6) According to a third aspect of the present invention, the present invention provides a display apparatus including an image processing intensity determination unit that determines an intensity of image processing; an image processing unit that performs the image processing to image information in accordance with the intensity determined by the image processing intensity determination unit; and an image display unit that displays an image subjected to the image processing in the image processing unit. The image processing intensity determination unit determines the intensity of the image processing at a target pixel included in the image information on the basis of a depth value indicating a depth corresponding to the target pixel and a vertical position of the target pixel in the image information.

Advantageous Effects of Invention

According to the present invention, it is possible to generate an image having an improved sense of depth also in long-distance view to resolve the first problem described above.

According to the present invention, it is possible to cause a user to feel the sense of depth to resolve the second problem described above.

According to the present invention, it is possible to generate an image for which the user feels depth to resolve the third problem described above.

DESCRIPTION OF EMBODIMENTS

Figure 1:
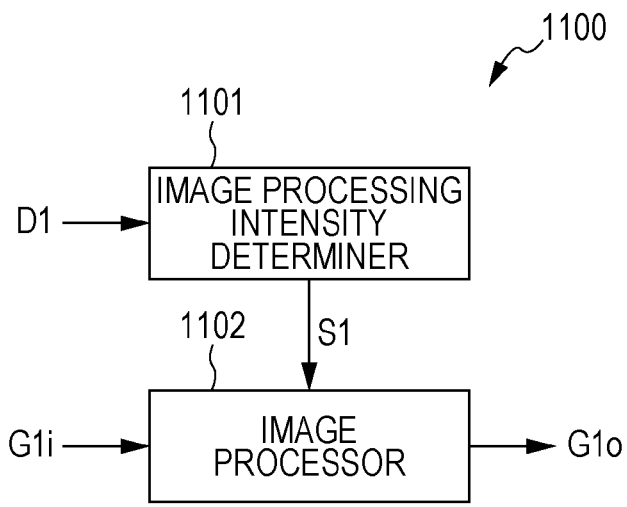
FIG. 1 is a block diagram schematically illustrating the configuration of an image processing apparatus 1100 in a first embodiment of the present invention.

Embodiments of the present invention will herein be described in detail with reference to the attached drawings. Graphs in, for example, FIG. 2, FIG. 3, and FIG. 7 described below are magnified in order to facilitate recognition of the relationship between values and the relationship illustrated in the drawings may be different from the actual relationship.

First Embodiment

FIG. 1 is a block diagram schematically illustrating the configuration of an image processing apparatus 1100 in a first embodiment of the present invention. Image information G1i, which is an input image, and depth information D1 corresponding to the image information G1i are input into the image processing apparatus 1100. The image processing apparatus 1100 performs image processing to the image information G1i on the basis of the depth information D1 to output the result of the processing as output image information G1o. The image information G1i may be data or a signal representing a moving image, such as a video signal, or may be data or a signal representing a still image, such as a Joint Photographic Experts Group (JPEG) file.

The depth information D1 corresponding to the image information G1i is information representing a depth value at each pixel in the image information G1i. The depth value at a pixel is a value representing the distance from a point of view to an object represented by the pixel. For example, in the case of an image of an object, which is taken by a camera, the depth value at a pixel is a value representing the distance from the camera (the point of view) to the object represented by the pixel. The depth information D1 in the present embodiment has one depth value for each pixel composing the image information G1i. In other words, the resolution of the image information G1i is equal to the resolution of the depth information D1. The resolution of the image information G1i may not be equal to the resolution of the depth information D1 as long as the depth value at each pixel in the image information G1i is acquired through, for example, interpolation. The depth value is increased with the increasing distance in the present embodiment, as described below.

As illustrated in FIG. 1, the image processing apparatus 1100 includes an image processing intensity determiner 1101 and an image processor 1102. The image processing intensity determiner 1101 determines an image processing intensity (an image processing intensity S1) for a target pixel included in the image information G1i on the basis of the depth value indicating the depth corresponding to the target pixel and a vertical position of the target pixel in the image information G1i. The image processing intensity determiner 1101 supplies the determined image processing intensity S1 to the image processor 1102. The image processor 1102 performs the image processing to improve the sense of depth to the image information G1i input into the image processing apparatus 1100 in accordance with the image processing intensity S1 determined by the image processing intensity determiner 1101 to output the result of the image processing as the output image information G1o.

Figure 2:
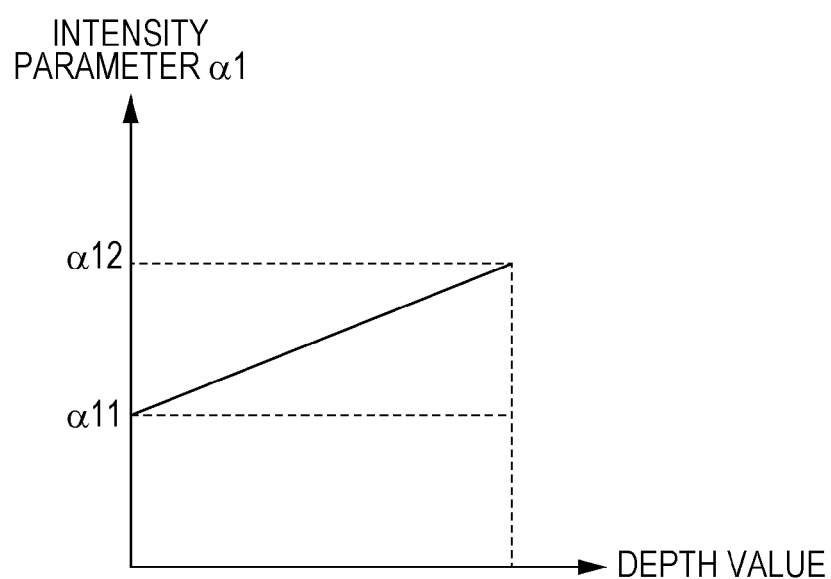
FIG. 2 is a graph illustrating an example of the relationship between depth values and an intensity parameter $\alpha 1$ in the first embodiment.
Figure 3:
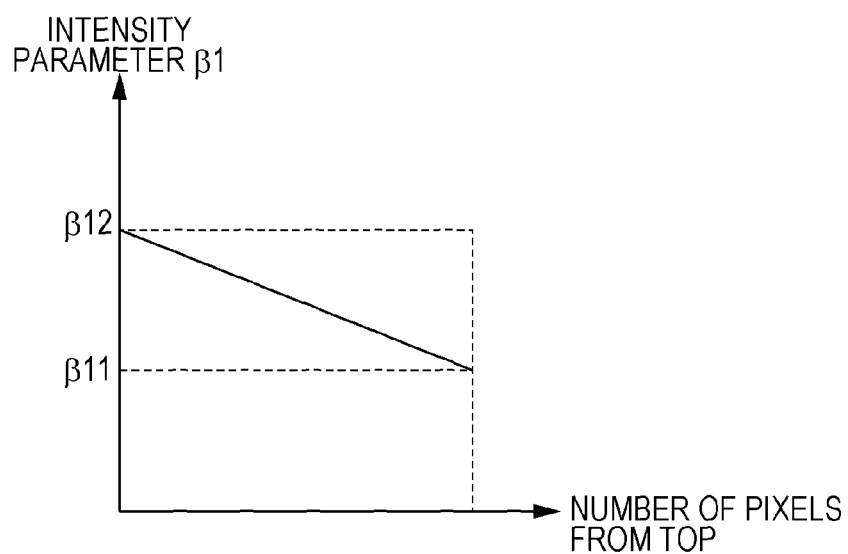
FIG. 3 is a graph illustrating an example of the relationship between pixel positions and an intensity parameter $\beta 1$ in the first embodiment.

The image processing intensity determiner 1101 sets each pixel included in the image information G1i as the target pixel to determine the image processing intensity S1 for each pixel in accordance with characteristics illustrated in FIG. 2 and FIG. 3. In the depth information in the present embodiment, the distance to the object in the image information is increased with the increasing value of the depth value. In other words, when the depth value is an eight-bit value, a grayscale value 0 represents an object in the shortest-distance view and a grayscale value 255 represents an object in the longest-distance view.

FIG. 2 is a graph illustrating an example of the relationship between the depth values and an intensity parameter $\alpha 1$. In the graph illustrated in FIG. 2, the intensity parameter $\alpha 1$ has a minimum value $\alpha 11$ when the depth value is at the minimum value (the grayscale value 0) and the intensity parameter $\alpha 1$ has a maximum value $\alpha 12$ when the depth value is at the maximum value (the grayscale value 255). The graph illustrated in FIG. 2 has the characteristics in which the intensity parameter $\alpha 1$ is increased with the increasing depth value (the increasing distance from the point of view). The relationship between the depth values and the intensity parameter α1 is preferably a monotonic increasing relationship in the light of continuity of the object. The image processing intensity S1 has a value indicating higher image processing intensity with the increasing intensity parameter α1, although the specific relationship between the intensity parameter α1 and the image processing intensity S1 is described below.

Although the intensity parameter α1 is maximized when the depth value is equal to 255 and the intensity parameter α1 is minimized when the depth value is equal to zero in the example in FIG. 2, the intensity parameter α1 may be appropriately set depending on the image information G1i that is input. For example, if the range of the depth values included in the depth information for one image that is input is from 20 to 100, the intensity parameter α1 is set so that the intensity parameter α1 is minimized when the depth value is equal to 20 and the intensity parameter α1 is maximized when the value of the depth information is equal to 100. This is preferred because it is possible to allocate the value appropriate for the image information G1i as the image processing intensity S1. When the image information G1i indicates a moving image, the maximum value and the minimum value may be detected in previous frames of a predetermined number without detecting the maximum value and the minimum value of the depth value for every frame.

FIG. 3 is a graph illustrating an example of the relationship between pixel positions and an intensity parameter β1. A position in the vertical direction (hereinafter referred to as a vertical position) in the image information G1i, that is, the number of pixels from the top in the image information G1i is used as the pixel position in FIG. 3. In other words, FIG. 3 indicates that the image processing intensity is varied with the vertical position of the pixel in the image information. In addition, since the value of the intensity parameter β1 is decreased with the increasing number of pixels from the top in FIG. 3, the image processing intensity is decreased as the vertical position is at a lower position in the image information G1i. In other words, the image processing intensity is increased with the upper vertical position in the image information G1i. A monotonic decreasing relationship is preferably established in the light of the continuity of the object.

The vertical position indicates the position in the image, represented by the image information G1i at the target pixel to be subjected to the image processing. For example, when the horizontal resolution of the image is 1920 and the vertical resolution of the image is 1080, a zero-th line has the uppermost vertical position and a 1,079-th line has the lowermost vertical position. The vertical direction of the image may be fixed to a predetermined direction in the case of, for example, a video signal and the vertical direction of the image may be determined depending on the vertical and horizontal directions specified in the file in the case of, for example, a JPEG file.

The image processing intensity determiner 1101 uses the image processing intensity S1 calculated using the above method if the depth value is lower than the maximum value (255 when the depth value is an eight-bit value) and sets the intensity parameter β1 as the image processing intensity S1 on the basis of the characteristics in FIG. 3 if the depth value is at the maximum value. For example, if an area in which the depth value is at the maximum value, that is, an area in which the depth value is saturated exists in the depth information D1, it is not possible to determine the positional relationship in the depth direction between multiple objects in the long-distance view in the area. Accordingly, when the depth value is at the maximum value, the image processing intensity S1 may be determined in accordance with the vertical position using the characteristics in FIG. 3. This is because, when the distance to the object is long enough to make the depth value saturated at the maximum value, the corresponding area in the image information G1i may be estimated to be in the long-distance view. This is also because an upper portion of the image information in the long-distance view is often empty and another object often exists in a lower portion of the image information.

Figure 4:
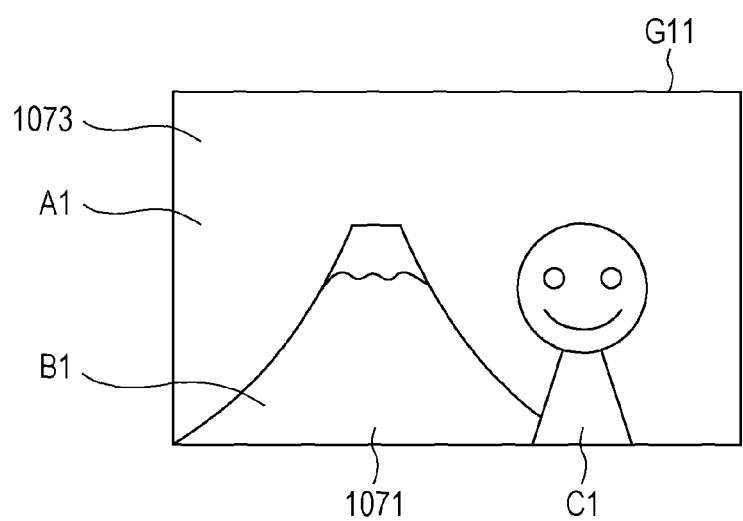
FIG. 4 illustrates an example of image information that is input in the first embodiment.
Figure 5:
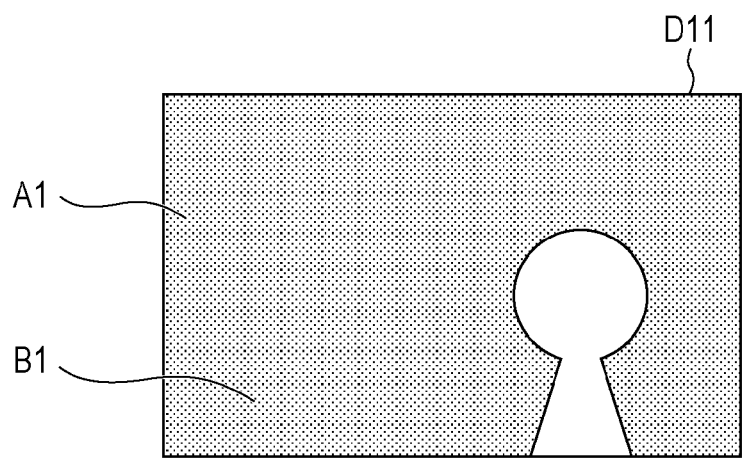
FIG. 5 illustrates an example of depth information that is input in the first embodiment.

For example, although an image region 1073 corresponding to an object A1 (the sky) has the same depth value as that of an image region 1071 corresponding to an object B1 (a mountain) in an image G11 and image information D11 in FIG. 4 and FIG. 5, the position in the depth direction of the image region 1073 is practically different from that of the image region 1071 and the object A1 (the sky) is on the farther side. In other words, the upper portion in the image information (the object A1 (the sky)) is in the longer-distance view, compared with the lower portion in the image information (the object B1 (the mountain)).

Accordingly, if the depth value is higher than or equal to a threshold value, the determination of the image processing intensity using the characteristics in FIG. 3 in the above manner allows the sense of depth to be improved. In other words, the determination of the image processing intensity on the basis of not only the depth information but also the vertical position enables the image processing in which the sense of depth is achieved even for an object the depth information about which is saturated.

Although the characteristics in FIG. 3 are used only when the depth value is saturated, similar effects are achieved also when the characteristics in FIG. 3 are applied to a specific range of the depth values. For example, the characteristics in FIG. 3 may be applied to the depth values determined to be in the long-distance view, that is, to the pixels the depth values of which are higher than the predetermined threshold value to use the intensity parameter β1 as the image processing intensity S1.

In addition, it is possible to generate an image having an improved sense of depth also in the long-distance view by taking the position of a vanishing point calculated from the image information into consideration in the determination of the image processing intensity S1.

Furthermore, the image processing intensity determiner 1101 may store a look-up table (LUT) in which the image processing intensity S1 is associated with a combination of the depth value and the vertical position in advance and the image processing intensity S1 may be determined with reference to the LUT. Alternatively, the image processing intensity determiner 1101 may store an LUT in which the depth value is associated with the intensity parameter α1 and an LUT in which the vertical position is associated with the intensity parameter β1 and the image processing intensity S1 may be determined by switching the LUT to be referred to depending on the depth value.

Furthermore, the image processing intensity determiner 1101 may adaptively determine the relationship between the depth value and the intensity parameter α1 depending on the range of the depth values included in the depth information D1 in the following manner. First, the intensity parameter α1 corresponding to the maximum value of the depth information D1 is set to the predetermined value α12. Next, the intensity parameter α1 corresponding to the minimum value of the depth information D1 is set to the predetermined value α11 (α11<α12). The intensity parameter α1 is calculated for the depth values between the maximum value and the minimum value using linear interpolation of α11 and α12.

Furthermore, the image processing intensity determiner 1101 may adaptively determine the relationship between the vertical position and the intensity parameter β1 depending on the range of the vertical positions in the area in which the depth value is at the maximum value in the following manner. First, the intensity parameter β1 corresponding to the maximum value of the vertical position in the area in which the depth value is at the maximum value is set to a predetermined value β12. Next, the intensity parameter β1 corresponding to the minimum value of the vertical position in the area in which the depth value is at the maximum value is set to a predetermined value β11 (β11<β12). The intensity parameter β1 is calculated for the vertical positions between the maximum value and the minimum value using linear interpolation of β11 and β12.

β11 preferably has a value equal to or higher than the value of α12. This prevents the image processing intensity in the area in which the depth value is at the maximum value from being lower than the image processing intensity in an area in which the depth value does not have the maximum value.

Furthermore, the image processing intensity determiner 1101 may calculate the image processing intensity S1 from α12×β1 or α12+β1 when the depth value is at the maximum value. In this case, if the image processing intensity S1 is maximized, the image processing intensity S1 is calculated from α12×β12 or α12+β12. This is preferred because the image processing intensity can be easily calculated in consideration of the vertical position even if the depth information has a high value, for example, the depth information is saturated. When the image processing intensity S1 is calculated from α12×β1, it is preferred that β1 constantly have a value equal to or higher than one in FIG. 3. When the image processing intensity S1 is calculated from α12+β1, it is preferred that β1 constantly has a value equal to or higher than zero in FIG. 3.

The image processor 1102 performs the image processing to improve the sense of depth to the image information G1i in accordance with the image processing intensity S1 determined by the image processing intensity determiner 1101. The image processing is preferably the contour enhancement, contrast correction, or color saturation correction. For example, when the image processing is the contour enhancement, the contour enhancement process is performed so that the contour is more strongly enhanced with the increasing value of the image processing intensity S1. The contour enhancement process is, for example, a process to convert a brightness value so that the difference in the brightness values (luminance, lightness, etc.) between adjacent pixels is increased. The contour is more strongly enhanced with the increasing difference in the brightness value. The above processing is realized with a spatial filter considering four or eight neighboring pixels.

When the image processing is the contrast correction, the contrast correction process is performed so that the contrast is more strongly enhanced with the increasing value of the image processing intensity S1. The contrast correction process is, for example, a process in which the contrast is corrected so that the brightness value is increased when the brightness value (the luminance, the lightness, a red (R) value, a green (G) value, a blue (B) value, etc.) is high and the contrast is corrected so that the brightness value is decreased when the brightness value is low. Here, the stronger contrast correction process is performed with the increasing amount of correction. The above processing is realized with the LUT in which the correction values are defined for the values that are input.

When the image processing is the color saturation correction, the color saturation correction process is performed so that the color saturation is increased with the increasing value of the image processing intensity S1. The color saturation correction process is a process to change the color saturation value so as to be increased. Here, the stronger color saturation correction process is performed with the increasing amount of change. The above processing is realized by multiplication or addition of the color saturation in a hue saturation and value (HSV: hue, saturation, and lightness) space or by linear conversion of the pixel value that is input with a matrix.

An image G11 in FIG. 4 is an example when an image of an object C1, which is a person on the front side, is captured in a state in which the object B1, which is a mountain, and the object A1, which is the sky, are arranged on the background. In such a case, since the contour of the object in the long-distance view is made blurred due to scattering of light and the like, the strength of the contour enhancement is preferably increased with the increasing distance to the object. In addition, since the image of the object C1 in short-distance view is clearly captured, an increase in the strength of the contour enhancement causes a sense of noise to be distinguished to degrade the image quality. Accordingly, performing the contour enhancement process in the manner described in the present embodiment allows an image having a clear contour to be generated while suppressing the degradation in the image quality. The long-distance view is made clear in the generated image to cause the user to easily feel a sense of distance with the short-distance view, thereby improving the sense of depth.

In addition, the contrast is also reduced due to the scattering of light and the like. Accordingly, the contrast correction is preferably performed, in which the contrast is enhanced with, for example, tone curve in which the contrast is more strongly enhanced with the increasing distance to the object. Since the image of the object C1 in the short-distance view is captured with a sufficient contrast and at a sufficient grayscale, excessive contrast correction causes a decrease in the number of grayscales to degrade the image quality. Accordingly, performing the contrast correction process in the manner described in the present embodiment allows an image having an improved sense of contrast to be generated while suppressing the degradation in the image quality. The long-distance view is made clear in the generated image to cause the user to easily feel the sense of distance with the short-distance view, thereby improving the sense of depth.

An image is preferred to have higher color saturation because of the colors that are stored and clearness and such an image is close to the actual object. However, for example, the skins of persons are required to have flesh color and excessive color saturation enhancement causes a feeling of strangeness to degrade the image quality. Accordingly, performing the color saturation correction process in the manner described in the present embodiment allows an image having increased color saturation with no feeling of strangeness to be generated while suppressing the degradation in the image quality. The generated image has the increased color saturation and is clear and the long-distance view is made clear in the generated image to cause the user to easily feel the sense of distance with the short-distance view, thereby improving the sense of depth.

As described above, according to the image processing apparatus 1100 of the present embodiment, the image processing intensity is varied in accordance with the depth information and the vertical position of the target pixel in the image processing to allow the high-quality image having the improved sense of depth to be generated also in the long-distance view.

Second Embodiment

Figure 6:
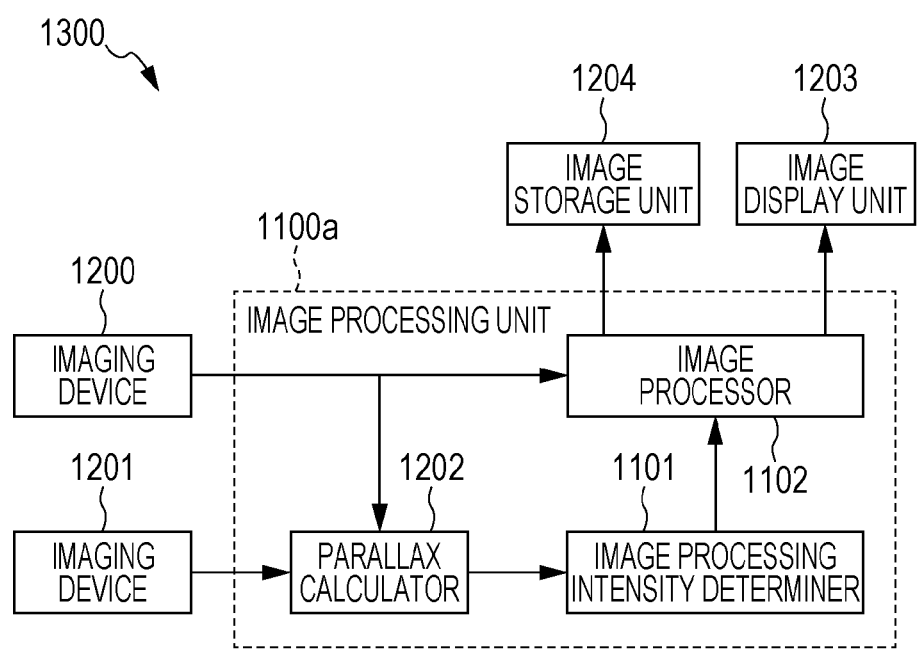
FIG. 6 is a block diagram schematically illustrating the configuration of an image capturing apparatus 1300 in a second embodiment of the present invention.

FIG. 6 is a block diagram schematically illustrating the configuration of an image capturing apparatus 1300 in a second embodiment of the present invention. The image capturing apparatus 1300 includes an imaging device 1200, an imaging device 1201, an image processing unit 1100a, an image display unit 1203, and an image storage unit 1204. The image processing unit 1100a includes a parallax calculator 1202, the image processing intensity determiner 1101, and the image processor 1102. The same reference numerals (1101 and 1102) are used in FIG. 6 to identify the same components illustrated in FIG. 1. A description of such components is omitted herein.

The imaging devices 1200 and 1201 are each composed of a lens module and a charge coupled device (CCD) imager or a complementary metal oxide semiconductor (CMOS) imager. The imaging device 1200 is arranged in parallel with the imaging device 1201. In other words, the point of view of an image captured and generated by the imaging device 1201 is different from the point of view of an image captured and generated by the imaging device 1200. The images captured and generated by the imaging devices 1200 and 1201 are supplied to the parallax calculator 1202. Among the images, the image generated by the imaging device 1200 is supplied to the image processor 1102.

The parallax calculator 1202 calculates the parallax corresponding to the image generated by the imaging device 1200 on the basis of the image generated by the imaging device 1200 and the image generated by the imaging device 1201 to set a value based on the parallax as the depth value. The parallax is the amount of shift between the objects in the two images and the parallax calculator 1202 can calculate the parallax through, for example, block matching. The relational expression of a distance Z to the object an image of which is captured and a parallax Di is $Di = f \times B / Z$. In the relational expression, f denotes a focal length of the imaging devices 1200 and 1201 and B denotes a base line length, which is the distance between the two imaging devices 1200 and 1201. Since the correlation is established between the distance Z and the parallax Di, the parallax calculator 1202 generates the depth information in which a value resulting from conversion of the parallax Di at each pixel is used as the depth value to supply the depth information to the image processing intensity determiner 1101.

Figure 7:
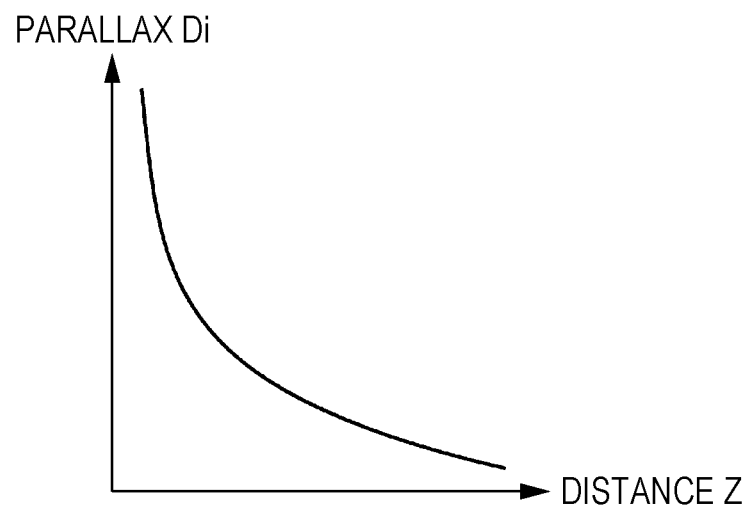
FIG. 7 is a graph illustrating the relationship between a distance Z and a parallax Di in the second embodiment.

A relationship illustrated in FIG. 7 is established between the distance Z and the parallax Di and a linear relationship is not established therebetween. Accordingly, the parallax calculator 1202 converts the parallax so that a linear relationship is established between the parallax and the distance. Specifically, the parallax calculator 1202 may convert the parallax Di into the distance Z using the relational expression between the distance Z and the parallax Di described above to use the distance Z as the depth value or may use a reciprocal of the parallax Di as the depth value. This is preferred because the image processing intensity corresponding to the distance can be applied even if the focal length and/or the base line length are unclear or indeterminate. The complete linear relationship is not necessarily established with the distance in the conversion of the parallax and similar effects can be achieved by substantially linear conversion.

The image display unit 1203 displays the image resulting from the processing in the image processor 1102. The image storage unit 1204 stores the image resulting from the processing in the image processor 1102.

As described above, according to the image capturing apparatus 1300 of the present embodiment, the image processing intensity is varied in accordance with the depth information and the vertical position of the target pixel in the image processing to allow the high-quality image having the improved sense of depth to be captured also in the long-distance view.

Although the image capturing apparatus 1300 including the two imaging devices is described in the present embodiment, similar effects can be achieved using a method of calculating the parallax from multiple images having different points of view even if the two imaging devices are not provided. For example, second image capturing may be performed at a point horizontally shifted from a first image capturing point to generate multiple images and the parallax may be calculated from the multiple images. A depth information calculator 1205 described below may be provided, instead of the parallax calculator 1202.

Although the parallax calculator 1202 in the present embodiment covers the parallax to calculate the value indicating the distance and supplies the value indicating the distance to the image processing intensity determiner 1101 as the depth information, the parallax calculator 1202 may supply the parallax to the image processing intensity determiner 1101 as the depth information. In this case, the image processing intensity determiner 1101 determines the image processing intensity in accordance with the parallax and the vertical position. The image processing intensity determiner 1101 determines the image processing intensity so that the image processing intensity is decreased with the decreasing parallax. For example, when the parallax is equal to zero, the image processing intensity corresponding to the vertical position is determined in accordance with the characteristics in FIG. 3.

Third Embodiment

Figure 8:
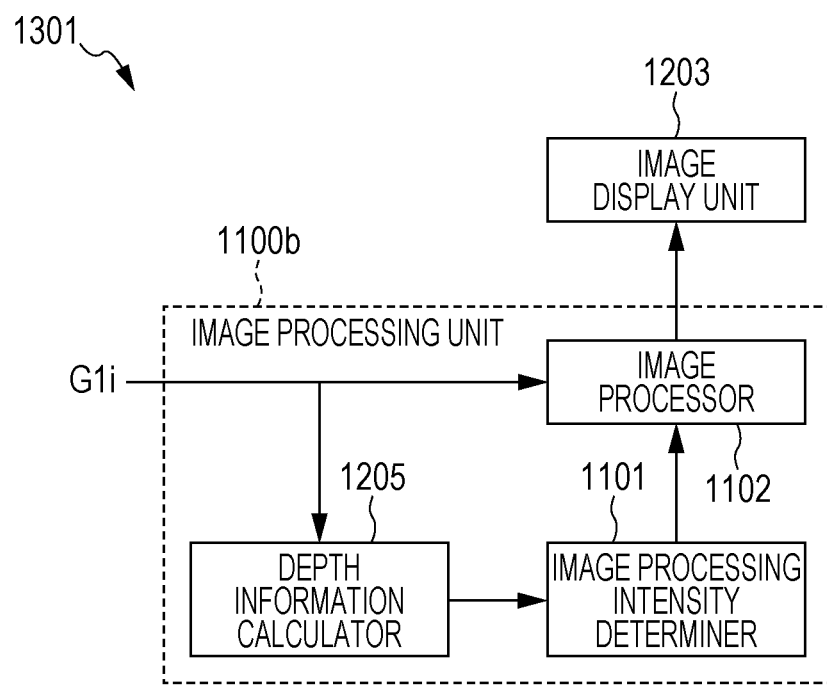
FIG. 8 is a block diagram schematically illustrating the configuration of an image display apparatus 1301 in a third embodiment of the present invention.

FIG. 8 is a block diagram schematically illustrating the configuration of an image display apparatus 1301 in a third embodiment of the present invention. The image display apparatus 1301 includes an image processing unit 1100b and the image display unit 1203. The image processing unit 1100b includes the depth information calculator 1205, the image processing intensity determiner 1101, and the image processor 1102. The same reference numerals (1101, 1102, and 1203) are used in FIG. 8 to identify the same components illustrated in FIG. 6. A description of such components is omitted herein.

The depth information calculator 1205 estimates the depth value corresponding to each pixel in the image information G1i that is input on the basis of the image information G1i to supply the depth information including the result of the estimation to the image processing intensity determiner 1101. Various estimation methods in the related art can be used for the estimation of the depth value. For example, a method of generating a three-dimensional image from a two-dimensional image through, for example, color information, vanishing point analysis, or object extraction may be used.

The image processing intensity determiner 1101 determines the image processing intensity S1 using the depth information that is supplied.

As described above, according to the image display apparatus 1301 of the present embodiment, the image processing intensity is varied in accordance with the depth information and the vertical position of the target pixel in the image processing to allow the high-quality image having the improved sense of depth to be displayed also in the long-distance view.

Although the image display apparatus 1301 including the depth information calculator 1205 is described in the present embodiment, the parallax may be calculated from a stereoscopic image to use the parallax as the depth information when the image information including information about the stereoscopic image and the like is supplied. In other words, the parallax calculator 1202 in the second embodiment may be provided. When the depth information is supplied along with the image information, the depth information may be directly supplied to the image processing intensity determiner 1101.

Fourth Embodiment

Embodiments of the present invention will herein be described in detail with reference to the attached drawings. The representation in the drawings is magnified in order to facilitate recognition and the representation may be different from the actual states.

Figure 9:
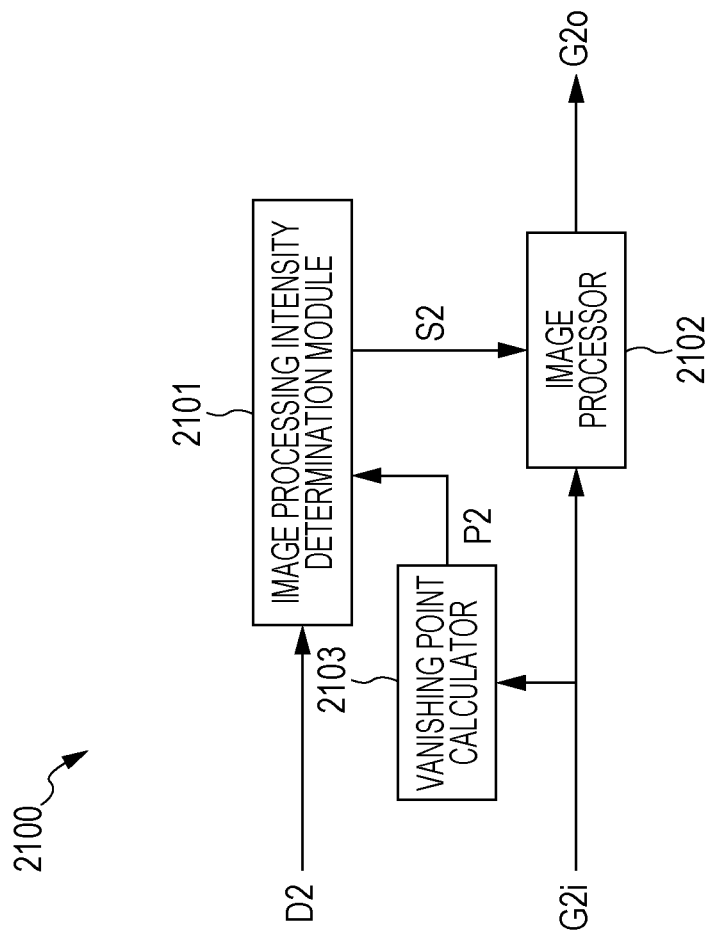
FIG. 9 is a schematic block diagram of an image processing apparatus in a fourth embodiment.

FIG. 9 is a schematic block diagram of an image processing apparatus 2100 in a fourth embodiment. The image processing apparatus 2100 includes an image processing intensity determination module 2101, an image processor 2102, and a vanishing point calculator 2103.

Image information G2i, which is an input image, and depth information D2 corresponding to the image information G2i are input into the image processing apparatus 2100. The image processing apparatus 2100 performs image processing to the image information G2i on the basis of the depth information D2 to output the result of the processing as output image information G2o. The image information G2i may be data or a signal representing a moving image, such as a video signal, or may be data or a signal representing a still image, such as a JPEG file.

As illustrated in FIG. 9, the image processing apparatus 2100 includes the vanishing point calculator 2103 and the vanishing point calculator 2103 calculates a vanishing point from the image information G2i. The vanishing point is a point at which lines intersect with each other when the lines that are actually parallel with each other are drawn as the ones that are not parallel with each other in perspective. The vanishing point calculator 2103 supplies the coordinate of the calculated vanishing point (hereinafter referred to as a vanishing point coordinate) to the image processing intensity determination module 2101.

The image processing intensity determination module 2101 determines an image processing intensity S2 at an object pixel to be subjected to the image processing in consideration of the distance between the object pixel and the position of the vanishing point calculated by the vanishing point calculator 2103.

The image processor 2102 performs the image processing to the image information in accordance with the image processing intensity S2 determined by the image processing intensity determination module 2101. Specifically, the image processor 2102 performs the image processing to improve the sense of depth at the image processing intensity S2 determined by the image processing intensity determination module 2101. Here, the image processing is preferably, for example, the contour enhancement, the contrast correction, or the color saturation correction.

The image processor 2102 externally outputs the image subjected to the image processing as the output image information G2o.

Each of the image processing intensity determination module 2101, the image processor 2102, and the vanishing point calculator 2103 may be composed of hardware, such as a field programmable gate array (FPGA), or software processed by, for example, a microcomputer (not illustrated) incorporated in the image processing apparatus 2100.

Figure 10:
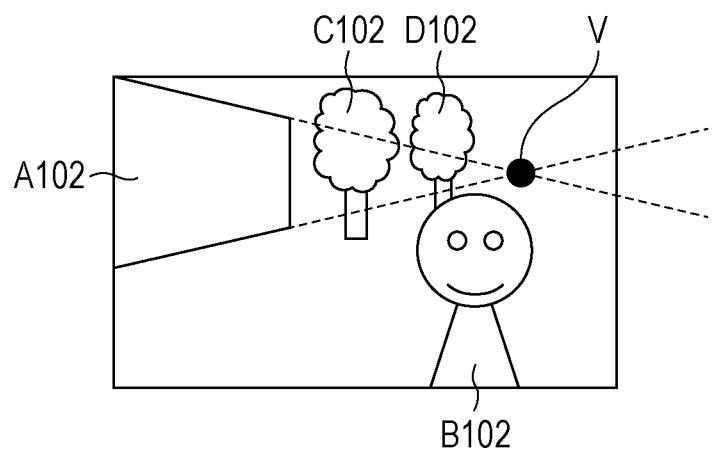
FIG. 10 is a schematic view of a captured image indicating an example of how to calculate a vanishing point.

FIG. 10 is a schematic view of a captured image indicating an example of how to calculate the vanishing point. The captured image is an exemplary image indicated by the image information G2i. An object A102 is represented in the schematic view of the captured image in FIG. 10. In FIG. 10, a point where a straight line, which is an extension of the lower contour of the object A102, intersects with a straight line, which is an extension of the upper contour of the object A102, is a vanishing point V.

The vanishing point calculator 2103 calculates the vanishing point of the image information G2i from the image information G2i. For example, the vanishing point calculator 2103 detects straight lines from the image information G2i that is input using known Hough transform, as illustrated in FIG. 10. In the example in FIG. 10, the vanishing point calculator 2103 calculates the straight lines from the upper and lower contours of the object A102. Then, the vanishing point calculator 2103 calculates the point at which the detected two straight lines intersect with each other as the vanishing point.

In addition, the vanishing point calculator 2103 may use the depth information D2 in the calculation of the vanishing point. For example, when multiple vanishing points are calculated from the straight lines detected using the Hough transform, the vanishing point calculator 2103 uses the depth information D2 to set a point having the depth information indicating the farthest point as the vanishing point. The vanishing point calculator 2103 is capable of calculating the vanishing point in the longest-distance view in the above manner.

<Detailed Description of Determination of Image Processing Intensity>

In the depth information D2 in the present embodiment, for example, the distance to the object in the image information G2i is increased with the increasing value of the depth information D2. In other words, when the eight-bit depth information D2 is input, a grayscale value 0 represents an object in the shortest-distance view and a grayscale value 255 represents an object in the longest-distance view.

Figure 11:
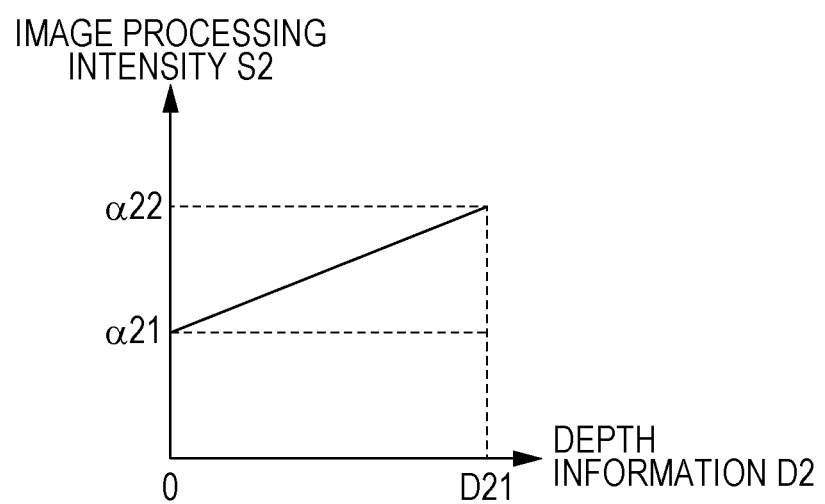
FIG. 11 is a graph illustrating an example of the relationship between an image processing intensity S2 and the value of depth information D2.

FIG. 11 is a graph illustrating an example of the relationship between the image processing intensity S2 and the value of the depth information D2. The vertical axis represents the image processing intensity S2 and the horizontal axis represents the depth information D2 in FIG. 11. In FIG. 11, the image processing intensity S2 is equal to $\alpha 21$ when the value of the depth information D2 is equal to zero and the image processing intensity S2 is equal to $\alpha 22$ when the value of the depth information D2 is equal to D21. A linear relationship is established between the value of the depth information D2 and the image processing intensity S2 in the example in FIG. 11, in which the image processing intensity S2 is increased with the increasing value of the depth information D2. The image processing intensity S2 preferably has the monotonic increasing relationship with the value of the depth information D2 in the light of the continuity of the object.

Although the image processing intensity S2 is maximized when the depth information D2 has the maximum value and the image processing intensity S2 is minimized when the depth information D2 has the minimum value in FIG. 11, the setting of the image processing intensity S2 is not limited to this and the image processing intensity S2 may be appropriately set depending on the information that is input. For example, when the range of the values of the depth information D2 for one image that is input is from 20 to 100, the image processing intensity determination module 2101 may set the image processing intensity S2 so that the image processing intensity S2 is minimized when the value of the depth information D2 is equal to 20 and the image processing intensity S2 is maximized when the value of the depth information D2 is equal to 100. The image processing intensity determination module 2101 is capable of allocating the value appropriate for the image information G2i to the image processing intensity S2 in the above manner.

Although the example in which the image processing intensity S2 is linearly increased with the value of the depth information D2 is indicated in FIG. 11, the increase in the image processing intensity S2 is not limited to this and the image processing intensity S2 may not linearly increased. It is sufficient for the image processing intensity S2 to tend to be increased with the increasing value of the depth information D2.

Figure 12:
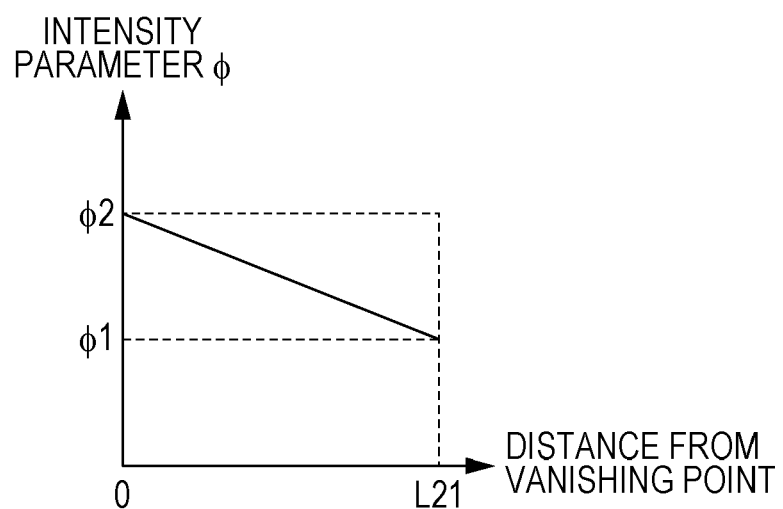
FIG. 12 is a graph illustrating an example of the relationship between an intensity parameter and the distance from the vanishing point.

FIG. 12 is a graph illustrating an example of the relationship between an intensity parameter $\phi$ and the distance between the vanishing point and the object pixel to be subjected to the image processing. The vertical axis represents the intensity parameter $\phi$ and the horizontal axis represents the distance between the vanishing point and the object pixel to be subjected to the image processing (the distance from the vanishing point) in FIG. 12. In FIG. 12, the intensity parameter $\phi$ is equal to $\phi 2$ when the distance from the vanishing point is equal to zero and the intensity parameter $\phi$ is equal to $\phi 1$ when the distance from the vanishing point is equal to L21. In the example in FIG. 12, a linear relationship is established between the intensity parameter $\phi$ and the distance from the vanishing point and the intensity parameter $\phi$ has characteristics in which the intensity parameter $\phi$ is increased with the decreasing distance from the vanishing point. The distance from the vanishing point is minimized when the object pixel is at the vanishing point. The intensity parameter $\phi$ preferably has the monotonic decreasing relationship with the distance from the vanishing point in the light of the continuity of the object.

The distance between the vanishing point and the object pixel may be a pixel-to-pixel distance or a city block distance. For example, when the vanishing point coordinate is (100, 100) and the coordinate of the object pixel is (200, 200), the distance from the vanishing point is 200 in the calculation of the distance from the vanishing point in the city block distance. In contrast, in the above example, the pixel-to-pixel distance is $\sqrt{2} \times 100$.

Although the example in which the intensity parameter $\phi$ is monotonically linearly decreased with the distance from the vanishing point is indicated in FIG. 12, the decrease in the intensity parameter $\phi$ is not limited to this and the intensity parameter $\phi$ may have a nonlinear relationship with the distance from the vanishing point. In other words, it is sufficient for the intensity parameter $\phi$ to tend to be decreased with the increasing distance from the vanishing point.

The image processing intensity determination module 2101 uses the image processing intensity S2 calculated with the above method if the depth value is lower than the maximum value (255 when the depth value is an eight-bit value) and sets the intensity parameter $\phi$ as the image processing intensity S2 using the characteristics in FIG. 12 if the depth value is at the maximum value. For example, if the area in which the depth value is at the maximum value, that is, the area in which the depth value is saturated exists in the depth information D2, it is not possible to determine the positional relationship in the depth direction between multiple objects in the long-distance view in the area. Accordingly, when the depth value is at the maximum value, the image processing intensity S2 may be determined in accordance with the distance from the vanishing point using the characteristics in FIG. 12. This is because the vanishing point is estimated to be at the farthest point in the long-distance view.

Figure 14:
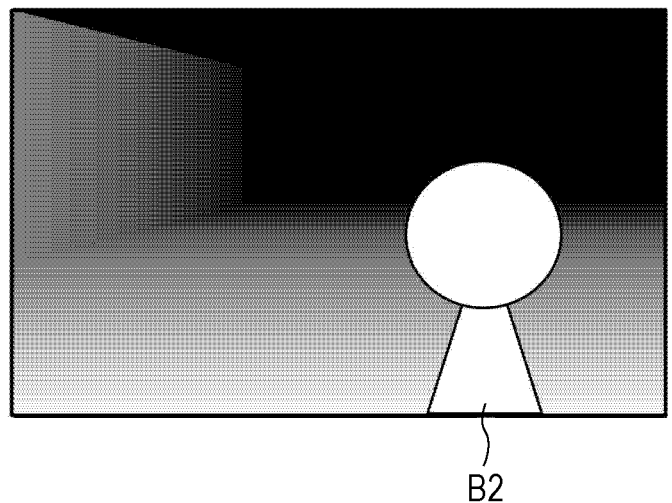
FIG. 14 is a diagram representing the value of the depth information at each pixel in the image information in FIG. 10.

FIG. 14 represents the depth information D2 corresponding to FIG. 10 in a diagram. Although the pixels in the long-distance view have the same depth information value, the pixels have different actual distances to the object. In other words, the pixel is in the longer-distance view with the decreasing distance from the vanishing point.

Accordingly, if the depth value is higher than or equal to a threshold value, the determination of the image processing intensity using the characteristics in FIG. 12 allows the sense of depth to be improved, as described above. In other words, the determination of the image processing intensity on the basis of not only the depth information but also the distance from the vanishing point enables the image processing in which the sense of depth is achieved even for an object the depth information about which is saturated.

For example, the image processing intensity determination module 2101 determines the image processing intensity S2 on the basis of the characteristics in FIG. 11 and FIG. 12.

Figure 13:
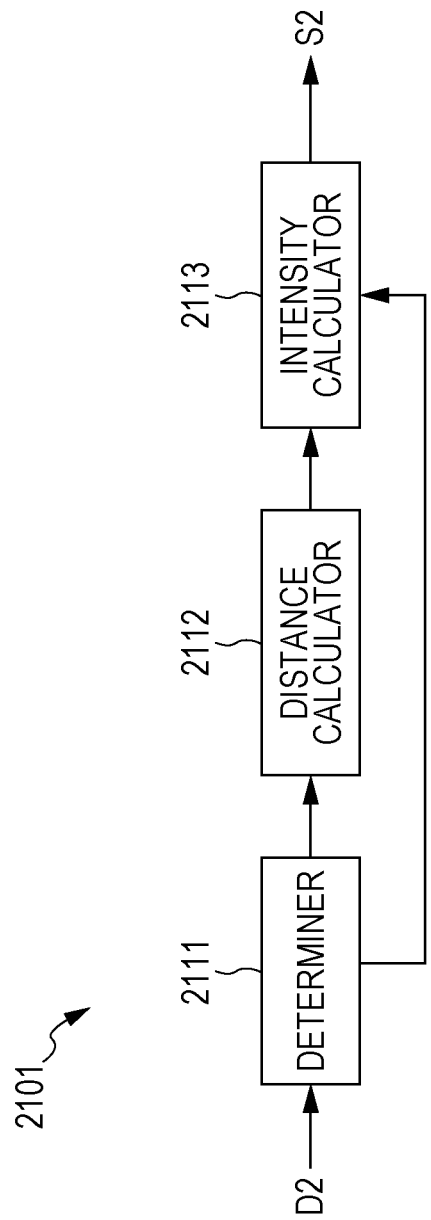
FIG. 13 is a block diagram schematically illustrating the configuration of an image processing intensity determination module in the fourth embodiment.

FIG. 13 is a block diagram schematically illustrating the configuration of the image processing intensity determination module 2101. The image processing intensity determination module 2101 includes a determiner 2111, a distance calculator 2112, and an intensity calculator 2113. The determiner 2111 receives the depth information D2 that is externally supplied. The determiner 2111 determines whether the value of the depth information D2 at the object pixel exceeds a predetermined threshold value. The value of the depth information D2 that exceeds the predetermined threshold value means that the value of the depth information D2 is saturated. If the value of the depth information D2 at the object pixel exceeds the predetermined threshold value, the determiner 2111 supplies the result of the determination to the distance calculator 2112. If the value of the depth information D2 at the object pixel is lower than the predetermined threshold value, the determiner 2111 supplies the result of the determination to the intensity calculator 2113 along with the depth information D2.

For example, when the depth information D2 that is input is an eight-bit value, it is determined that the value of the depth information D2 is saturated if the depth information D2 is equal to 255 when the threshold value is 254 and it is determined that the value of the depth information D2 is saturated if the depth information D2 is equal to 255 or 254 when the threshold value is 253.

If the result of the determination supplied from the determiner 2111 indicates that the value of the depth information D2 at the object pixel exceeds the predetermined threshold value, the distance calculator 2112 calculates the distance between the object pixel to be subjected to the image processing and the vanishing point. The distance calculator 2112 supplies the calculated distance to the intensity calculator 2113.

The intensity calculator 2113 determines the image processing intensity S2 on the basis of the distance supplied from the distance calculator 2112. Specifically, if the value of the depth information D2 at the object pixel is saturated, the intensity calculator 2113 decreases the image processing intensity with the increasing distance between the object pixel and the vanishing point. For example, the intensity calculator 2113 applies the distance supplied from the distance calculator 2112 to the characteristics in FIG. 12 to calculate the image processing intensity S2.

In other words, if the value of the depth information D2 is higher than the predetermined threshold value, the image processing intensity determination module 2101 increases the image processing intensity S2 with the decreasing distance between the object pixel and the vanishing point.

For example, if an area including the maximum value of the depth information D2 exits in the image information G2i, it is not possible to determine the positional relationship in the depth direction between multiple objects in the long-distance view in the area. Accordingly, the image processing intensity determination module 2101 determines the image processing intensity S2 corresponding to the distance from the vanishing point using the characteristics in FIG. 12, for example, when the value of the depth information D2 is at the maximum value. This is because the vanishing point is in the longest-distance view and the point is estimated in the longer-distance view with the decreasing distance from the vanishing point.

If the result of the determination supplied from the determiner 2111 indicates that the value of the depth information D2 at the object pixel is lower than or equal to the predetermined threshold value, the intensity calculator 2113 determines the image processing intensity S2 on the basis of the value of the depth information D2. Specifically, for example, the intensity calculator 2113 applies the depth information D2 supplied from the determiner 2111 to the characteristics in FIG. 11 to calculate the image processing intensity S2.

In other words, if the value of the depth information D2 is lower than or equal to the predetermined threshold value, the image processing intensity determination module 2101 increases the image processing intensity S2 with the increasing value of the depth information D2.

Then, the intensity calculator 2113 determines whether the image processing intensity S2 is calculated for all the pixels in the frame. If the image processing intensity S2 is not calculated for all the pixels in the frame, the intensity calculator 2113 supplies a request signal to request the determiner 2111 to set a pixel next to the object pixel (for example, an adjacent pixel) as a new object pixel to the determiner 2111. Upon reception of the request signal, the determiner 2111 determines whether the depth information D2 corresponding to the new object pixel exceeds the predetermined threshold value. If the image processing intensity S2 is calculated for all the pixels in the frame, the intensity calculator 2113 supplies the image processing intensity S2 at each pixel to the image processor 2102.

An exemplary process in the image processing intensity determination module 2101 will now be described. The image processing intensity determination module 2101 holds the constant $\alpha 21$ and the constant $\alpha 22$ in FIG. 11 and the constant $\phi 1$ and the constant $\phi 2$ in FIG. 12 in advance. The image processing intensity determination module 2101 performs the following processing if the value of the depth information D2 is lower than or equal to the predetermined threshold value. The image processing intensity determination module 2101 sets the image processing intensity S2 so that the image processing intensity S2 is equal to the constant $\alpha 22$ at the maximum value of the depth information D2 and the image processing intensity S2 is equal to the constant $\alpha 21$ at the minimum value of the depth information D2.

The image processing intensity determination module 2101 is capable of maximizing the image processing intensity S2 at the maximum value of the depth information D2 and minimizing the image processing intensity S2 at the minimum value of the depth information D2 in the above manner. The image processing intensity determination module 2101 linearly interpolates the constant $\alpha 21$ and the constant $\alpha 22$ to calculate the image processing intensity S2 when the depth information D2 has a value between the maximum value and the minimum value.

The image processing intensity determination module 2101 performs the following processing if the value of the depth information D2 is higher than or equal to the predetermined threshold value. The image processing intensity determination module 2101 sets the image processing intensity S2 so that the image processing intensity S2 is equal the constant $\phi 2$ at the minimum value of the distance from the vanishing point where the image processing intensity S2 is maximized and the image processing intensity S2 is equal to the constant $\phi 1$ at the maximum value of the distance from the vanishing point where the image processing intensity S2 is minimized. The image processing intensity determination module 2101 linearly interpolates the constant $\phi 1$ and the constant $\phi 2$ to calculate the image processing intensity S2 when the distance from the vanishing point has a value between the maximum value and the minimum value.

For example, if $\phi$ is a variable that is determined on the basis of the distance from the vanishing point, the image processing intensity determination module 2101 may calculate the image processing intensity from $S2 \times \phi$ or $S2 + \phi$. When the image processing intensity is maximized, the image processing intensity is calculated from $\alpha 22 \times \phi 2$ or $\alpha 22 + \phi 2$.

The image processing intensity determination module 2101 is capable of easily calculating the image processing intensity in consideration of the distance from the vanishing point in the above manner even if the value of the depth information D2 is high enough to be saturated.

In other words, the image processing intensity determination module 2101 may increase the image processing intensity S2 as the depth information D2 indicates a deeper point and may increase the image processing intensity S2 with the decreasing distance between the object pixel and the vanishing point.

When the image processing intensity S2 is calculated from FIG. 11 and FIG. 12, the image processing apparatus 2100 may hold a look-up table (LUT) in which the image processing intensity S2 is associated with the value of the depth information D2 and the distance from the vanishing point. In this case, the image processing intensity determination module 2101 may refer to the LUT to read out the image processing intensity S2 corresponding to the value of the depth information D2 and the distance from the vanishing point.

The method of calculating the distance from the vanishing point after the determination using the threshold value is described with reference to FIG. 13. Since the distance is calculated only when it is determined that the depth value at the pixel is saturated in the method, it is possible to reduce the amount of processing to be appropriate for the software processing. In the case of the hardware processing, the calculation of the distance from the vanishing point is realized by calculating the distances from the vanishing point at all the pixels to select the distance from the vanishing point on the basis of the depth information.

A process in the image processing intensity determination module 2101 will now be described with reference to FIG. 10 and FIG. 14. FIG. 14 is a diagram representing the value of the depth information D2 at each pixel in the image information in FIG. 10. In FIG. 14, the color of the pixel is blackened with the increasing value of the depth information D2, that is, as the object is on the deeper side and the color of the pixel is whitened with the decreasing value of the depth information D2, that is, as the object is on the nearer side.

For example, an object C102 and an object D102 in the long-distance view in FIG. 10 has the same value of the depth information D2 even at different positions, as illustrated in FIG. 14. Accordingly, the object C102 has the same image processing intensity S2 as that of the object D102 if the image processing intensity S2 is determined only on the basis of the value of the depth information D2 despite the fact that the object D102 closer to the vanishing point is on the farther side, compared with the object C102.

Since the distances from the vanishing point to the objects D102, C102, and A102 are increased in this order in the example in FIG. 10, the image processing intensity determination module 2101 decreases the image processing intensity in the order of, for example, the objects D102, C102, and A102. Accordingly, the image processing intensity determination module 2101 is capable of making the image processing intensity S2 of the object D102 higher than the image processing intensity S2 of the object C102. Specifically, since the image processing intensity determination module 2101 varies the image processing intensity S2 on the basis of the distance between the object pixel to be subjected to the image processing and the vanishing point even in the area in which the depth information D2 is saturated, it is possible to set the image processing intensity S2 corresponding to the distance to the object.

In other words, the image processing intensity determination module 2101 is capable of setting the image processing intensity S2 in accordance with not only the depth information D2 but also the distance between the object pixel and the vanishing point to perform the image processing in which the sense of depth is achieved even for an object the depth information D2 about which is saturated. Accordingly, the image processing intensity determination module 2101 is capable of generating the image having the improved sense of depth.

Although the image processing intensity determination module 2101 determines the image processing intensity S2 in accordance with the distance between the object pixel and the vanishing point when the depth information D2 is saturated in the above examples, the image processing intensity determination module 2101 may determine the image processing intensity S2 in accordance with the distance between the object pixel and the vanishing point when the value of the depth information D2 is within a predetermined specific range (for example, the value of the depth information D2 is higher than a predetermined threshold value). The image processing intensity determination module 2101 is capable of achieving effects similar to the ones in the above examples in this case.

For example, it is assumed that, if the value of the depth information D2 is within a predetermined specific range, the pixel having the depth information D2 is in the long-distance view. In this case, the image processing intensity determination module 2101 determines the image processing intensity S2 in accordance with the distance between the object pixel and the vanishing point for the pixel the value of the depth information D2 about which is within the specific range. Since the image processing intensity determination module 2101 is capable of determining the image processing intensity S2 in accordance with the distance between the object pixel and the vanishing point for the image region in the long-distance view in the above manner, it is possible to generate the image having the improved sense of depth in the long-distance view.

When the scene illustrated in FIG. 10 is captured, a main object is an object B102 arranged in the short-distance view and the object C102 and the object D102 arranged in the long-distance view are on the background. Since the contours of the objects in the long-distance view are made blurred due to the scattering of light and the like, the strength of the contour enhancement is preferably increased with the increasing distance to the object in the processing in the image processor 2102. In addition, since the image of the object B102 in the short-distance view is clearly captured, an increase in the strength of the contour enhancement causes the sense of noise to be distinguished to degrade the image quality.

Accordingly, the image processor 2102 enhances the contour of the image information G2i on the basis of the image processing intensity S2 determined by the image processing intensity determination module 2101. Specifically, the image processor 2102 performs the contour enhancement process so that the contour of the image information G2i is more strongly enhanced with the increasing image processing intensity S2. The contour enhancement process is, for example, a process to convert the brightness value so that the difference in the brightness value between adjacent pixels is increased. The contour is more strongly enhanced with the increasing difference in the brightness value. The above processing is realized with the spatial filter considering four or eight neighboring pixels. For example, when the object pixel having a pixel value P20 and the four neighboring pixels having pixel values P21, P22, P23, and P24 are considered, a pixel value P2 after the image processing is capable of being calculated from $P2=P20+(P20\times4-P21-P22-P23-P24)\times\alpha2$ (or $\beta2$). In this equation, $\alpha2$ and $\beta2$ are parameters calculated from the depth information and the distance from the vanishing point.

The image processor 2102 is capable of generating the clear image in the above manner. The image processing apparatus 2100 makes the long-distance view of the image clear to cause the user who watches the image to easily feel the sense of distance with the short-distance view, thereby improving the sense of depth of the image. As a result, the image processing apparatus 2100 is capable of causing the user to feel the sense of depth.

In addition, the contrast is also reduced due to the scattering of light and the like in the long-distance view. Accordingly, the processing in the image processor 2102 is preferably the contrast correction process in which the contrast is enhanced with, for example, the tone curve. Since the image of the object C102 in the short-distance view is captured with a sufficient contrast and at a sufficient grayscale, excessive contrast correction causes a decrease in the number of grayscales to degrade the image quality.

Accordingly, the image processor 2102 may perform the contrast correction process so that the contrast of the image information G2i is increased with the increasing image processing intensity S2. The contrast correction process is, for example, the process in which the contrast is corrected so that the brightness value is increased when the brightness value is high and the contrast is corrected so that the brightness value is decreased when the brightness value is low. Here, the stronger contrast correction process is performed with the increasing amount of correction. The above processing is realized with the LUT in which the corrected values are defined for the values that are input.

The image processor 2102 is capable of generating the image having the improved sense of contrast in the above manner. As a result, the image processing apparatus 2100 makes the long-distance view of the image clear to cause the user who watches the image to easily feel the sense of distance with the short-distance view, thereby improving the sense of depth of the image. As a result, the image processing apparatus 2100 is capable of causing the user to feel the sense of depth.

An image is preferred to have higher color saturation because of the colors that are stored and clearness and such an image is close to the actual object. However, for example, the skins of persons are required to have flesh color and excessive color saturation enhancement causes the feeling of strangeness to degrade the image quality. Accordingly, the image processor 2102 may perform the color saturation correction to the image information G2i on the basis of the image processing intensity S2 determined by the image processing intensity determination module 2101. Specifically, the image processor 2102 may perform the color saturation correction process so that the color saturation is increased with the increasing image processing intensity S2. The color saturation correction process is realized by multiplication or addition of the color saturation in the HSV space or by linear conversion of the pixel value that is input with a matrix. The image processor 2102 is capable of varying the color saturation on the basis of the depth information D2 and the distance from the vanishing point in the above manner. As a result, the image processor 2102 is capable of enhancing the color saturation in the long-distance view of the image to generate the image having the increased color saturation with no feeling of strangeness.

Since the image processing apparatus 2100 increases the color saturation in the long-distance view of the image to make the long-distance view clear in the above manner and causes the user who watches the image to easily feel the sense of distance with the short-distance view, it is possible to improve the sense of depth of the image. As a result, the image processing apparatus 2100 is capable of causing the user to feel the sense of depth.

Figure 15:
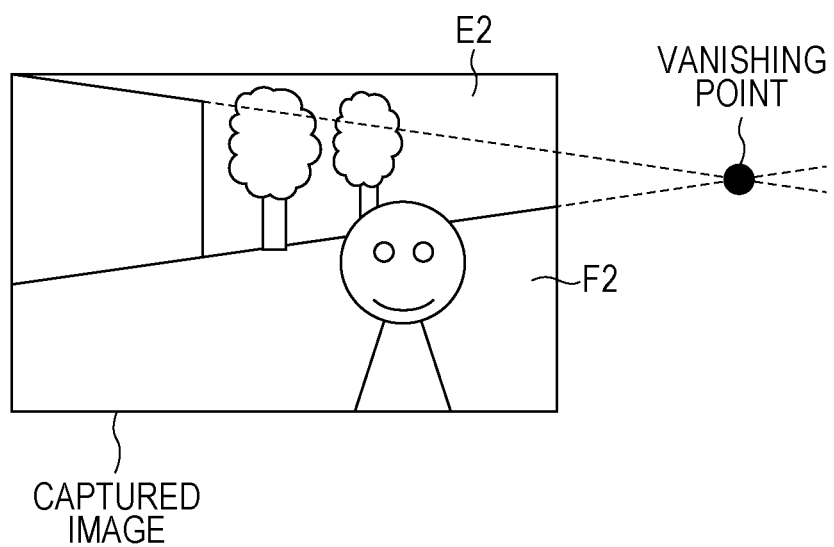
FIG. 15 illustrates an exemplary case in which the vanishing point is outside the image information.

The same processing applies also to a case in which the vanishing point coordinate is outside the image information G2i. FIG. 15 illustrates an example of the case in which the vanishing point is outside the image information G2i. The vanishing point that is outside the captured image is indicated in FIG. 15.

For example, when the image information G2i has a resolution of 1920×1080 and the vanishing point is outside the image information G2i, the image processing apparatus 2100 permits values outside the image information G2i, such as (2500, 500), as the vanishing point coordinate to apply the same processing even when the vanishing point is outside the image information G2i.

In addition, in the image information G2i, an object, such as the sky, like an object E2 frequently exists in an upper portion with respect to the vanishing point and an object, such as the ground or a mountain, like an object F2 frequently exists in a lower portion with respect to the vanishing point. This indicates that the object in the upper portion with respect to the vanishing point is often on the farther side, compared with the object in the lower portion with respect to the vanishing point. Accordingly, the image processing intensity determination module 2101 may determine the image processing intensity S2 on the basis of the positional relationship in the vertical direction between the object pixel and the vanishing point in the image information G2i. For example, the image processing intensity determination module 2101 may increase the image processing intensity S2 with the increasing vertical distance from the vanishing point on the upper side and may decrease the image processing intensity S2 with the increasing vertical distance from the vanishing point on the lower side.

In other words, the image processing intensity determination module 2101 determines the image processing intensity S2 on the basis of the positional relationship in the vertical direction between the object pixel and the vanishing point, in addition to the distance between the object pixel and the vanishing point. For example, when the object pixel is at an upper position with respect to the vanishing point, the image processing intensity determination module 2101 uses $\epsilon$ ($\epsilon$>1) multiple of the image processing intensity S2 used when the object pixel is at the same distance from the vanishing point and is at a lower position with respect to the vanishing point. $\epsilon$ may be a function corresponding to the distance from the vanishing point. Since the image processing apparatus 2100 is capable of closely considering the positional relationship of the object in this case and performs the image processing at the image processing intensity S2 corresponding to the positional relationship of the object, it is possible to make the long-distance view of the image clear to improve the sense of depth of the image. As a result, the image processing apparatus 2100 is capable of causing the user to feel the sense of depth.

Figure 16:
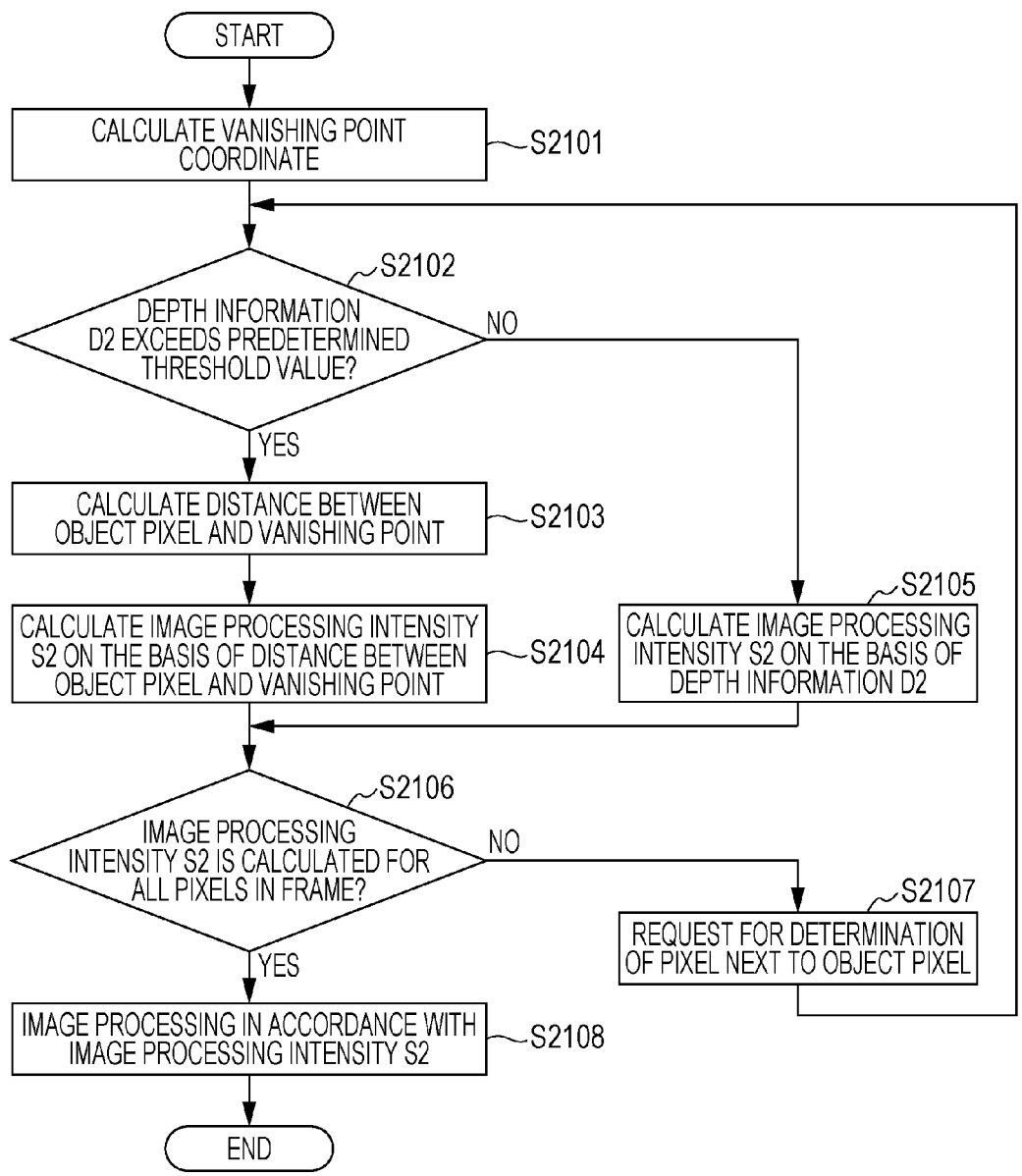
FIG. 16 is a flowchart illustrating an exemplary process in the image processing apparatus in the fourth embodiment.

FIG. 16 is a flowchart illustrating an exemplary process in the image processing apparatus 2100 in the fourth embodiment. First, the vanishing point calculator 2103 calculates the vanishing point coordinate on the basis of the image information G2i (Step S2101). Next, the determiner 2111 determines whether the depth information D2 corresponding to the object pixel exceeds a predetermined threshold value (Step S2102).

If the depth information D2 corresponding to the object pixel exceeds the predetermined threshold value (YES in Step S2102), the distance calculator 2112 calculates the distance between the object pixel and the vanishing point (Step S2103). Next, the intensity calculator 2113 calculates the image processing intensity S2 on the basis of the distance between the object pixel and the vanishing point (Step S2104).

If the depth information D2 corresponding to the object pixel is lower than or equal to the predetermined threshold value in Step S1202 (NO in Step S2102), the intensity calculator 2113 calculates the image processing intensity S2 on the basis of the depth information D2 (Step S2105). Then, the process goes to Step S2106.

Next, in Step S2106, the intensity calculator 2113 determines whether the image processing intensity S2 is calculated for all the pixels in the frame (Step S2106). If the image processing intensity S2 is not calculated for all the pixels in the frame (NO in Step S2106), the intensity calculator 2113 requests the determiner 2111 to perform the determination of a pixel next to the object pixel (Step S2107). Then, the process goes back to Step S2102.

If the image processing intensity S2 is calculated for all the pixels in the frame in Step S2106 (YES in Step S2106), the image processor 2102 performs the image processing to the image information G2i at each pixel in accordance with the image processing intensity S2 at the pixel (Step S2108). Then, the process in the flowchart is terminated.

As described above, the image processing apparatus 2100 of the present embodiment determines the image processing intensity S2 on the basis of the depth information D2 and the distance between the object pixel and the vanishing point. Accordingly, since the image processing apparatus 2100 performs the image processing to the image at the determined image processing intensity S2, it is possible to make the long-distance view of the image clear to improve the sense of depth of the image. As a result, the image processing apparatus 2100 is capable of causing the user to feel the sense of depth.

Fifth Embodiment

Figure 17:
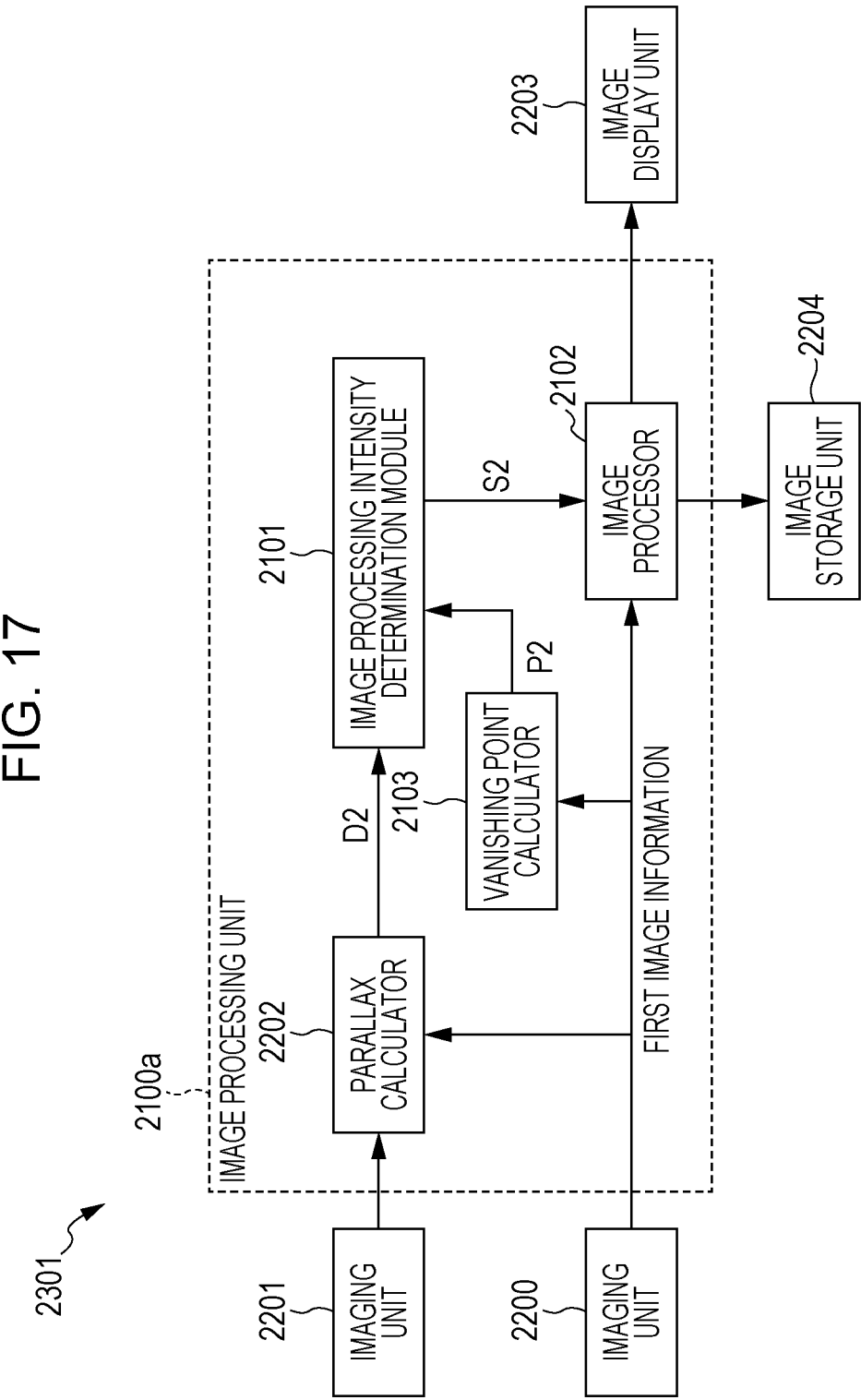
FIG. 17 is a schematic block diagram of an image capturing apparatus in a fifth embodiment.

FIG. 17 is a schematic block diagram of an image capturing apparatus 2301 in a fifth embodiment. The same reference numerals are used in FIG. 17 to identify the same components illustrated in FIG. 9. A specific description of such components is omitted herein. The image capturing apparatus 2301 includes an imaging unit 2200, an imaging unit 2201, an image processing unit 2100a, an image display unit 2203, and an image storage unit 2204. The configuration of the image processing unit 2100a in FIG. 17 results from addition of a parallax calculator 2202 to the configuration of the image processing apparatus 2100 of the fourth embodiment in FIG. 9.

The two imaging units: the imaging unit 2200 and the imaging unit 2201 are arranged in parallel with each other.

The imaging units 2200 and 2201 are each composed of a lens module and an image sensor, such as a charge coupled device (CCD) or a complementary metal oxide semiconductor (CMOS).

The imaging unit 2200 captures an image of an object to supply first image information acquired through the image capturing to the parallax calculator 2202.

Similarly, the imaging unit 2201 captures an image of the object to supply second image information acquired through the image capturing to the parallax calculator 2202.

The parallax calculator 2202 calculates the parallax corresponding to each pixel in an input image on the basis of the input image and an image the parallax of which is different from that of the input image to determine the depth information D2 on the basis of the calculated parallax.

The parallax is the amount of shift between the objects in the two images. Specifically, for example, the parallax calculator 2202 calculates the parallax value corresponding to each pixel in the first image information through the block matching using the first image information supplied from the imaging unit 2200 and the second image information supplied from the imaging unit 2201.

The relationship between a distance Z to the object an image of which is captured and a parallax d is d=f×B/Z. In the above expression, f denotes a focal length of the imaging units and B denotes a base line length, which is the distance between the two imaging units. The correlation is established between the distance Z and the parallax d from the relational expression of the distance Z and the parallax d described above. In the present embodiment, the image processing unit 2100a calculates the depth information D2 on the basis of the parallax d.

Figure 18:
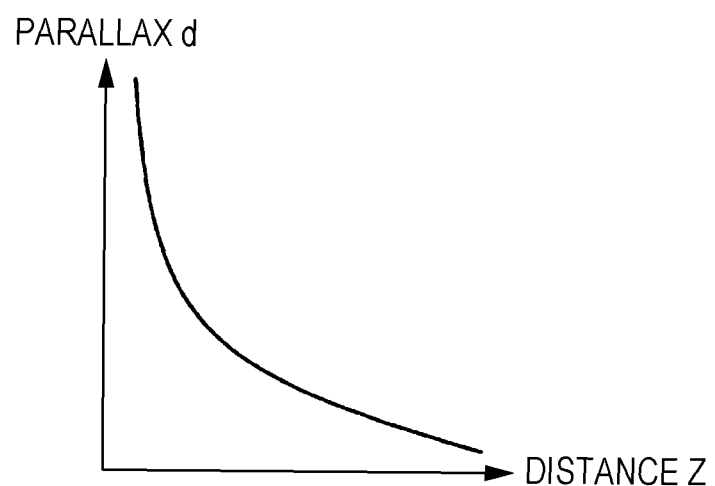
FIG. 18 is a graph illustrating the relationship between the distance Z and a parallax d.

FIG. 18 is a graph illustrating the relationship between the distance Z and the parallax d. As illustrated in FIG. 18, the distance Z is inversely proportional to the parallax d and a linear relationship is not established between the distance Z and the parallax d. Accordingly, the parallax calculator 2202 converts the parallax d so as to establish the linear relationship with the distance and uses the value resulting from the conversion as the depth information D2. Specifically, for example, the parallax calculator 2202 calculates a reciprocal of the calculated parallax d (1/d) and uses the reciprocal of the calculated parallax d as the depth information D2. The parallax calculator 2202 supplies the calculated depth information D2 to the image processing intensity determination module 2101.

This is preferred because the image processing unit 2100a is capable of applying the image processing intensity S2 corresponding to the distance. The conversion of the parallax may not necessarily result in a completely linear relationship with the distance and may result in a substantially linear relationship.

The parallax calculator 2202 may directly use the calculated parallax d as the depth information D2. In this case, the depth information D2 is decreased with the increasing distance to the object and is increased with the decreasing distance to the object. Accordingly, the image processing intensity determination module 2101 may increase the image processing intensity S2 with the decreasing value of the depth information D2. Accordingly, the image processing intensity determination module 2101 is capable of increasing the image processing intensity S2 with the deeper side which the depth information D2 indicates.

The image processing intensity determination module 2101 determines the image processing intensity S2 on the basis of the depth information D2 supplied from the parallax calculator 2202 and the vanishing point coordinate supplied from the vanishing point calculator 2103. The image processor 2102 performs the image processing at the image processing intensity S2 determined by the image processing intensity determination module 2101. The image processor 2102 causes the image display unit 2203 to display the output image information resulting from the image processing and causes the image storage unit 2204 to store the output image information resulting from the image processing.

As described above, according to the image capturing apparatus 2301 of the present embodiment, the image processing intensity S2 at the object pixel is determined on the basis of the depth information D2 and the distance between the object pixel of the image processing and the vanishing point to generate the high-quality image having the improved sense of depth.

Although the image capturing apparatus 2301 including the two imaging units is described in the present embodiment, similar effects can be achieved using a method of calculating the parallax information from multiple images. For example, this can be realized by performing second image capturing at a point horizontally shifted from a first image capturing point. A depth information calculator described below may be provided, instead of the parallax calculator 2202.

Sixth Embodiment

Figure 19:
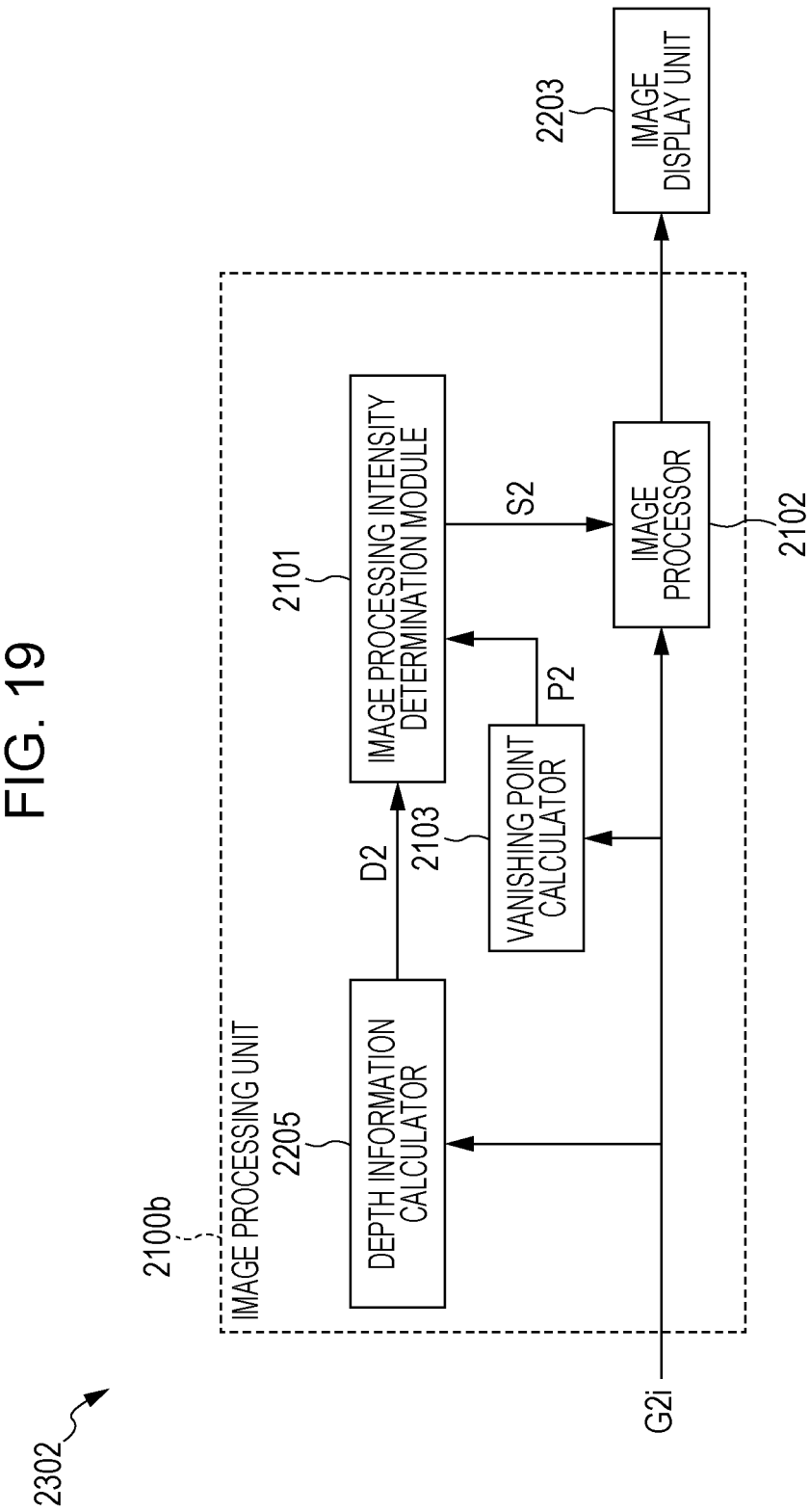
FIG. 19 is a schematic block diagram of a display apparatus in a sixth embodiment.

FIG. 19 is a schematic block diagram of a display apparatus 2302 in a sixth embodiment. The same reference numerals are used in FIG. 19 to identify the same components illustrated in FIG. 9. A specific description of such components is omitted herein. The display apparatus 2302 includes an image processing unit 2100b and the image display unit 2203. The configuration of the image processing unit 2100b in FIG. 19 results from addition of a depth information calculator 2205 to the configuration of the image processing apparatus 2100 in the fourth embodiment in FIG. 9.

The depth information calculator 2205 estimates the depth information D2 from the image information G2i supplied from the outside of the display apparatus. Various estimation methods in the related art can be used for the estimation of the depth information D2. For example, the depth information calculator 2205 generates a three-dimensional image from a two-dimensional image through, for example, color information, vanishing point analysis, region splitting, or object extraction to generate the depth information D2. The depth information calculator 2205 supplies the estimated depth information D2 to the image processing intensity determination module 2101.

Although the image processor 2102 has functions similar to those of the image processor 2102 of the fourth embodiment, the image processor 2102 differs from the image processor 2102 of the fourth embodiment in the following point. The image processor 2102 causes the image display unit 2203 to display the image subjected to the image processing.

As described above, the display apparatus 2302 of the present embodiment determines the image processing intensity S2 at the object pixel on the basis of the depth information D2 and the distance between the object pixel of the image processing and the vanishing point. Accordingly, the display apparatus 2302 is capable of displaying the high-quality image having the improved sense of depth.

Although the display apparatus 2302 including the depth information calculator 2205 is described in the present embodiment, the parallax may be calculated from a stereoscopic image and the depth information D2 may be calculated on the basis of the parallax to determine the image processing intensity on the basis of the calculated depth information D2 when the image information including information about the stereoscopic image and the like is input. Also in this case, the display apparatus 2302 is capable of achieving effects similar to the above ones. When the depth information D2 is input into the display apparatus 2302 along with the image information, the depth information D2 may be directly supplied to the image processing intensity determination module 2101 in the display apparatus 2302.

Although each of the image processing apparatus (2100) and the image processing units (2100a and 2100b) in the embodiments determines the image processing intensity S2 on the basis of the distance between the object pixel and the vanishing point and the depth information D2, the determination of the image processing intensity S2 is not limited to this.

The image processing apparatus (2100) or the image processing unit (2100a or 2100b) may determine the image processing intensity S2 at the object pixel positioned on the upper side with respect to a predetermined position in the image in accordance with the distance between the object pixel and the vanishing point. The image processing apparatus (2100) or the image processing unit (2100a or 2100b) may extract a background image region, which is the background, such as the sea, the sky, or a mountain, through feature information extraction to determine the image processing intensity S2 for the background image region in accordance with the distance between the object pixel and the vanishing point.

A system including multiple apparatuses may dispersedly process the processing in the image processing apparatus (2100) and the image processing units (2100a and 2100b) of the embodiments with the multiple apparatuses.

Alternatively, a program to execute the processing in the image processing apparatus (2100) and the image processing units (2100a and 2100b) of the embodiments may be recorded on a computer-readable recording medium, and a computer system may be caused to read out and execute the program recorded on the recording medium to perform the various processes described above according to the image processing apparatus (2100) or the image processing unit (2100a or 2100b).

Seventh Embodiment

Embodiments of the present invention will herein be described in detail with reference to the attached drawings. The representation in the drawings is magnified in order to facilitate recognition and the representation may be different from the actual states.

Figure 20:
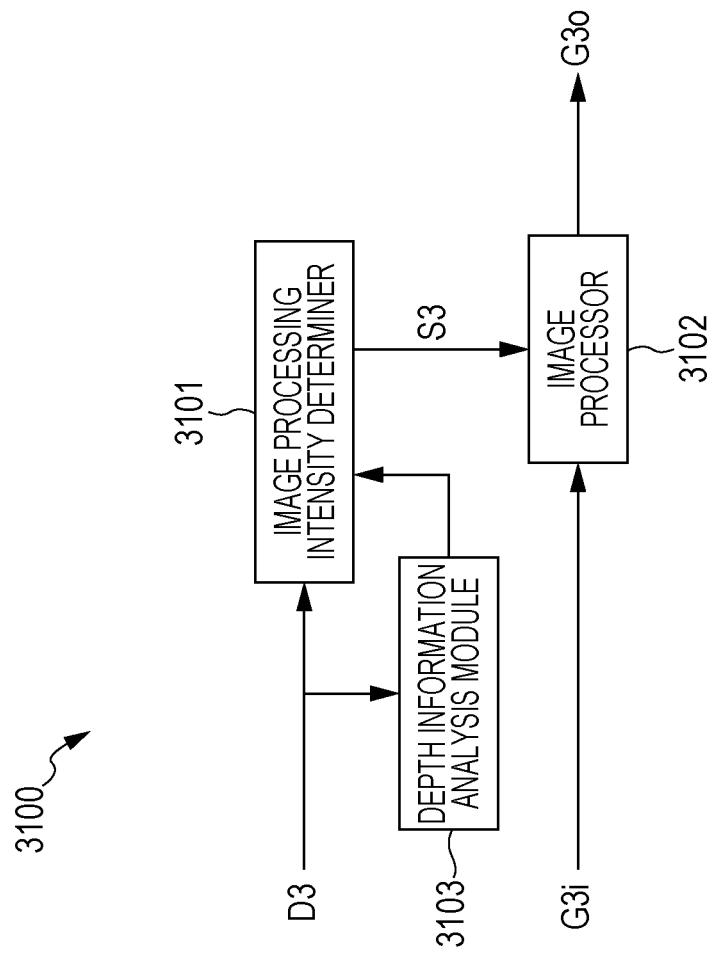
FIG. 20 is a schematic block diagram of an image processing apparatus in a seventh embodiment.

FIG. 20 is a schematic block diagram of an image processing apparatus 3100 in a seventh embodiment. The image processing apparatus 3100 includes an image processing intensity determiner 3101, an image processor 3102, and a depth information analysis module 3103.

Image information G3i, which is an input image, and depth information D3 corresponding to the image information G3i are input into the image processing apparatus 3100. The image information is, for example, a grayscale value at each pixel composing an image. The depth information is information indicating the depth corresponding to the image information. The distance to the object in the image information is increased with the increasing value of the depth information in the present embodiment. In other words, when the eight-bit depth information is input, a grayscale value 0 represents an object in the shortest-distance view and a grayscale value 255 represents an object in the longest-distance view.

The image processing apparatus 3100 performs image processing to the image information G3i on the basis of the depth information D2 to output the result of the processing as output image information G3o.

The image information G3i may be data or a signal representing a moving image, such as a video signal, or may be data or a signal representing a still image, such as a JPEG file.

The depth information analysis module 3103 extracts information about frequency distribution of the depth information D3 on the basis of the depth information D3 corresponding to the image information. Specifically, for example, the depth information analysis module 3103 calculates first depth information and second depth information according to a predetermined rule on the basis of the frequency distribution of the depth information D3 for one piece of image information that is input. The first depth information and the second depth information are values of different pieces of depth information D3. The depth information analysis module 3103 supplies the extracted information (for example, the first depth information and the second depth information) about the frequency distribution of the depth information D3 to the image processing intensity determiner 3101. The process in the depth information analysis module 3103 will be described in detail below.

The image processing intensity determiner 3101 determines an image processing intensity S3 at each pixel in the image information on the basis of the information extracted by the depth information analysis module 3103 and the depth information D3 supplied from the outside of the image processing apparatus 3100. The image processing intensity determiner 3101 supplies the determined image processing intensity S3 to the image processor 3102.

The image processor 3102 performs the image processing to the image information at each pixel in accordance with the image processing intensity at the pixel, determined by the image processing intensity determiner 3101. The image processing here is preferably the contour enhancement, the contrast correction, or the color saturation correction. The image processor 3102 externally outputs the image generated through the image processing as the output image information G3o.

Each of the image processing intensity determiner 3101, the image processor 3102, and the depth information analysis module 3103 may be composed of hardware, such as a field programmable gate array (FPGA), or software processed by, for example, a microcomputer (not illustrated) incorporated in the image processing apparatus 3100.

<Detailed Description of Process in Depth Information Analysis Module 3103>

The process in the depth information analysis module 3103 will now be described in detail.

Figure 21:
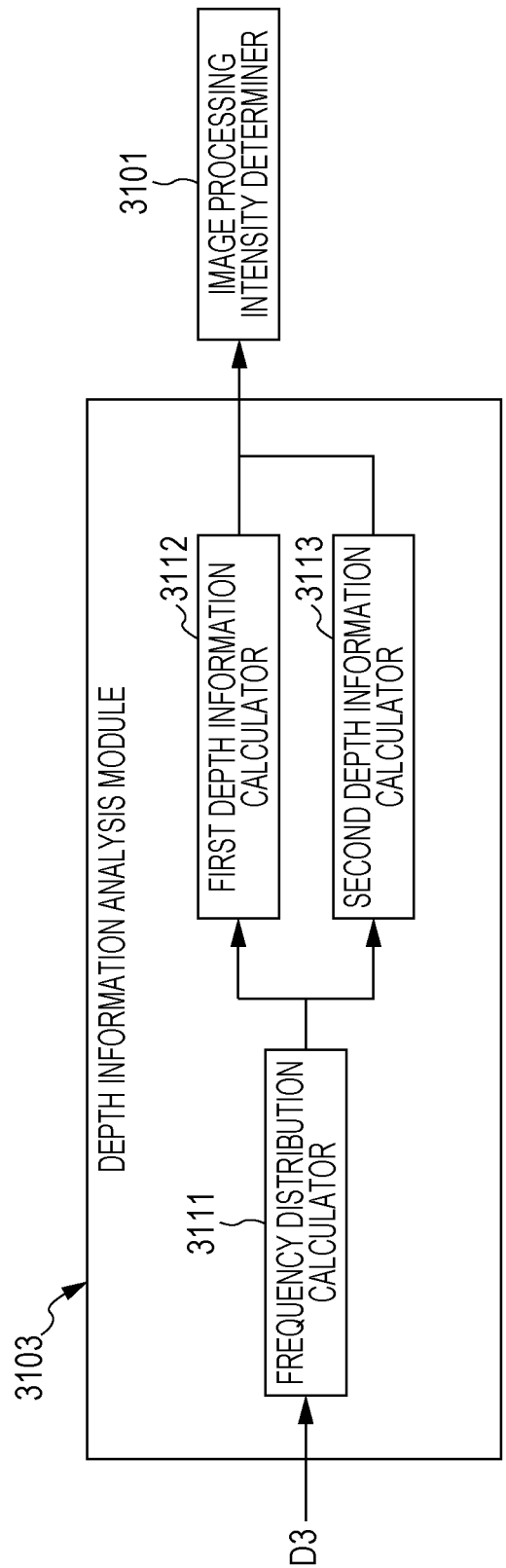
FIG. 21 is a schematic block diagram of a depth information analysis module in the seventh embodiment.

FIG. 21 is a schematic block diagram of the depth information analysis module 3103 in the seventh embodiment. The depth information analysis module 3103 includes a frequency distribution calculator 3111, a first depth information calculator 3112, and a second depth information calculator 3113.

The frequency distribution calculator 3111 calculates the frequency distribution of the depth information D3 supplied from the outside of the image processing apparatus 3100 to supply the calculated frequency distribution to the first depth information calculator 3112 and the second depth information calculator 3113.

The first depth information calculator 3112 calculates the value of depth information D3 min at which the depth information D3 is minimized in a range in which the frequency is higher than or equal to a threshold value $\alpha 3$ in the frequency distribution supplied from the frequency distribution calculator 3111 as the first depth information. The first depth information calculator 3112 supplies the calculated first depth information to the image processing intensity determiner 3101.

The second depth information calculator 3113 calculates the value of depth information D3max at which the depth information D3 is maximized in the range in which the frequency is higher than or equal to the threshold value $\alpha 3$ in the frequency distribution supplied from the frequency distribution calculator 3111 as the second depth information. The second depth information calculator 3113 supplies the calculated second depth information to the image processing intensity determiner 3101.

Figure 22:
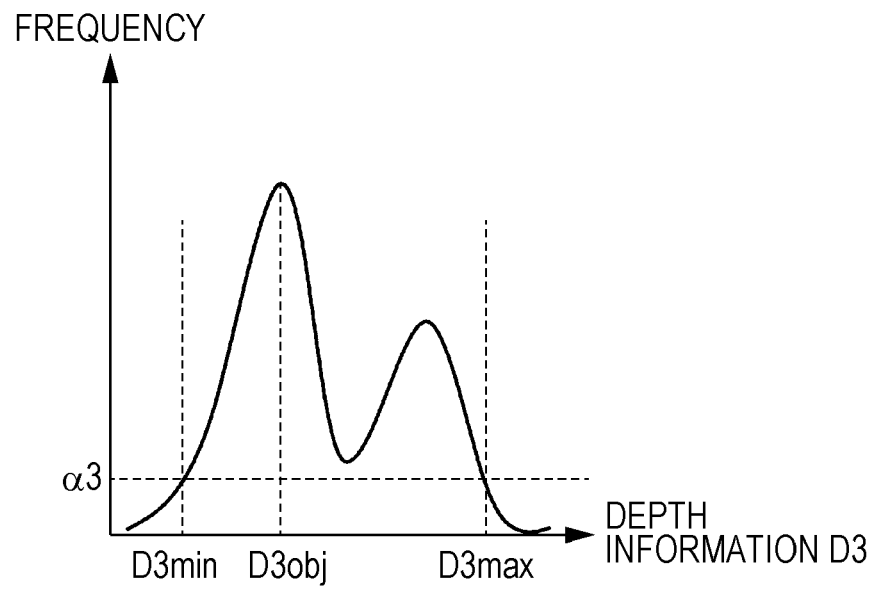
FIG. 22 is a graph illustrating an example of frequency distribution of the depth information.

The process in the depth information analysis module 3103 will now be described with reference to FIG. 22. FIG. 22 is a graph illustrating an example of the frequency distribution of the depth information. The horizontal axis represents the depth information and the vertical axis represents frequency in FIG. 22. Depth information D3obj in which the frequency is maximized is illustrated in FIG. 22. The minimum value D3 min of the depth information D3 (hereinafter referred to as a range minimum value) in the range in which the frequency is higher than or equal to the threshold value $\alpha 3$ and the maximum value D3max of the depth information D3 (hereinafter referred to as a range maximum value) in the range in which the frequency is higher than or equal to the threshold value $\alpha 3$ are illustrated in FIG. 22.

For example, the depth information analysis module 3103 calculates the first depth information and the second depth information using the frequency distribution (histogram) of the depth information D3, as illustrated in FIG. 22. The calculation of the maximum value and the minimum value using a normal method here causes the depth information to be calculated as the maximum value and the minimum value, respectively, even when the frequency is lower than the predetermined threshold value $\alpha 3$ to possibly cause a calculation error, for example, when noise exists in the depth information.

In the present embodiment, the depth information analysis module 3103 calculates the minimum depth information D3 in the range in which the frequency of the depth information is higher than or equal to the predetermined threshold value as the first depth information in the frequency distribution of one piece of depth information. The depth information analysis module 3103 calculates the maximum depth information D3 in the range in which the frequency of the depth information D3 is higher than or equal to the predetermined threshold value as the second depth information in the distribution of one piece of depth information. The depth information analysis module 3103 supplies the first depth information and the second depth information that are calculated to the image processing intensity determiner 3101.

The depth information analysis module 3103 is capable of stably calculating the first depth information and the second depth information in the above manner.

The depth information analysis module 3103 may estimate that the main object exists at a local maximum value of the frequency. For example, the depth information analysis module 3103 estimates that the main object exists at the depth information (mode value) D3obj the value of the frequency of which is maximized among the local maximum values.

The depth information analysis module 3103 may split the image information G3i into arbitrary regions (for example, 16-split regions resulting from longitudinal splitting into four regions and lateral splitting into four regions) and may create a histogram for each region to estimate the position of the object. In this case, for example, in the case of an object that disproportionately exists in a specific region, although the object does not appear as the local maximum value in the histogram of the entire depth information, the object may appear as the local maximum value in the histogram of a split region. The depth information analysis module 3103 is capable of estimating the depth information about each object in the image information G3i in the above manner.

The depth information analysis module 3103 supplies the result of the analysis of the depth information, calculated in the above manner, to the image processing intensity determiner 3101.

<Detailed Description of Process in Image Processing Intensity Determiner 3101>

Figure 23:
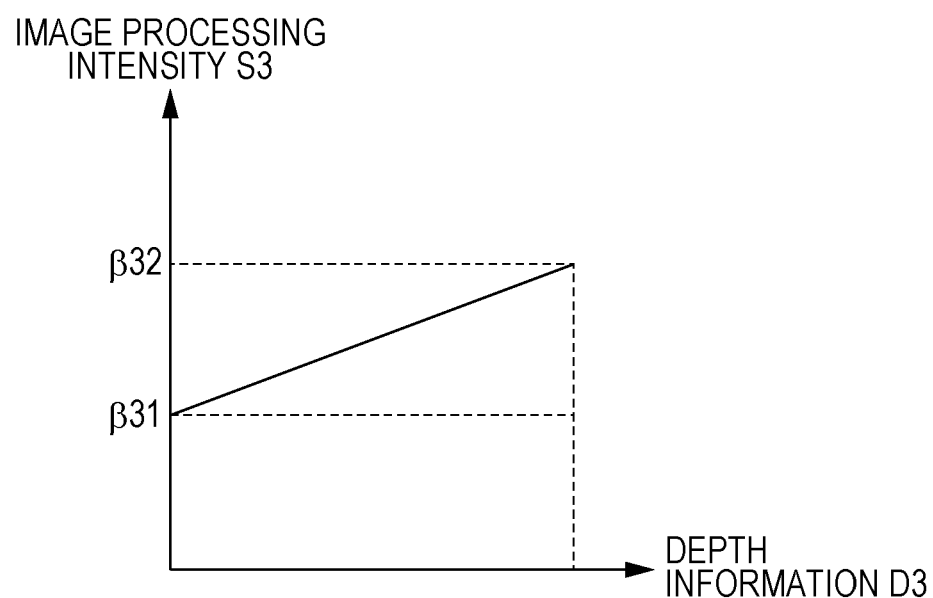
FIG. 23 is a graph illustrating an example of the relationship between an image processing intensity S3 and depth information D3.

FIG. 23 is a graph illustrating an example of the relationship between the image processing intensity S3 and the depth information D3. The horizontal axis represents the depth information D3 and the vertical axis represents the image processing intensity S3 in FIG. 23. The characteristics in which the image processing intensity S3 is linearly increased with the increasing value of the depth information D3 are illustrated in FIG. 23. The image processing intensity S3 preferably has the monotonic increasing relationship with the depth information D3 in the light of the continuity of the object.

The image processing intensity is maximized when the depth information D3 is at the maximum value (for example, 255) in the range of the values of the depth information D3 and the image processing intensity S3 is minimized when the depth information D3 is at the minimum value (for example, zero) in the range of the values of the depth information D3 in FIG. 23.

However, the image information that is practically input is distributed in part of the range of the grayscale values of the depth information, as illustrated in FIG. 22. Accordingly, the effects of the image processing may not be sufficiently achieved.

Accordingly, the image processing intensity determiner 3101 determines the image processing intensity using the first depth information and the second depth information calculated by the depth information analysis module 3103. The image processing intensity determiner 3101 varies the image processing intensity in a desired range between the first depth information and the second depth information.

Figure 24:
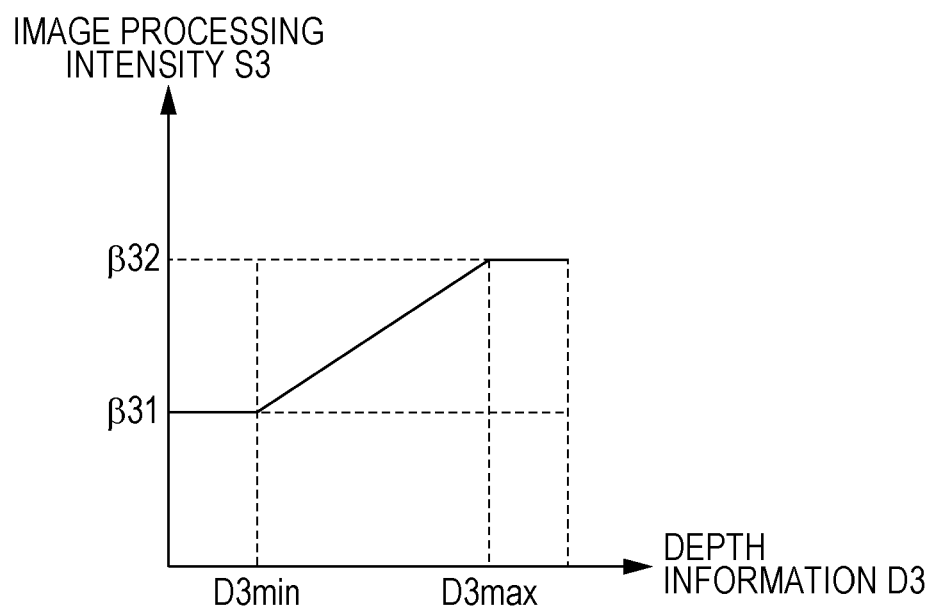
FIG. 24 is a graph illustrating an example of how to set the image processing intensity with respect to the depth information.

FIG. 24 is a graph illustrating an example of how to set the image processing intensity with respect to the depth information. The horizontal axis represents the depth information D3 and the vertical axis represents the image processing intensity S3 in FIG. 24. The image processing intensity S3 is equal to β31 at the range minimum value D3 min and the image processing intensity S3 is equal to β32 at the range maximum value D3max in FIG. 24. The characteristics in which the image processing intensity S3 is linearly increased with the increasing value of the depth information in a range from the range minimum value D3 min to the range maximum value D3max are illustrated in FIG. 24.

The image processing intensity S3 is kept at β31 when the depth information D3 is lower than or equal to D3 min and the image processing intensity S3 is kept at β32 when the depth information D3 is higher than or equal to D3max.

The image processing intensity determiner 3101 determines the image processing intensity from, for example, the characteristics illustrated in FIG. 24. Specifically, when the image processing intensity S3 is varied between β31 and β32 for the image processing, the image processing intensity determiner 3101 sets the image processing intensity S3 so that the image processing intensity S3 is equal to β31 at the range minimum value D3 min and is equal to β32 at the range maximum value D3max and contiguously sets the image processing intensity S3 for the depth information D3 between the range minimum value D3 min and the range maximum value D3max. The image processing intensity determiner 3101 sets the correspondence relationship between the depth information D3 and the image processing intensity S3 in the above manner. The image processing intensity determiner 3101 applies the depth information D3 at each pixel to the set correspondence relationship between the depth information D3 and the image processing intensity S3 to calculate the image processing intensity S3 at each pixel.

In the example of the present embodiment, the range minimum value D3 min is used as the first depth information and the range maximum value D3max is used as the second depth information. In this case, the image processing intensity determiner 3101 determines the image processing intensity so that the image processing intensity S3 is maximized at the second depth information, the image processing intensity is minimized at the first depth information, and the image processing intensity S3 is increased with the increasing depth information D3 between the first depth information and the second depth information.

<Detailed Description of Process in Image Processor 3102>

Figure 25:
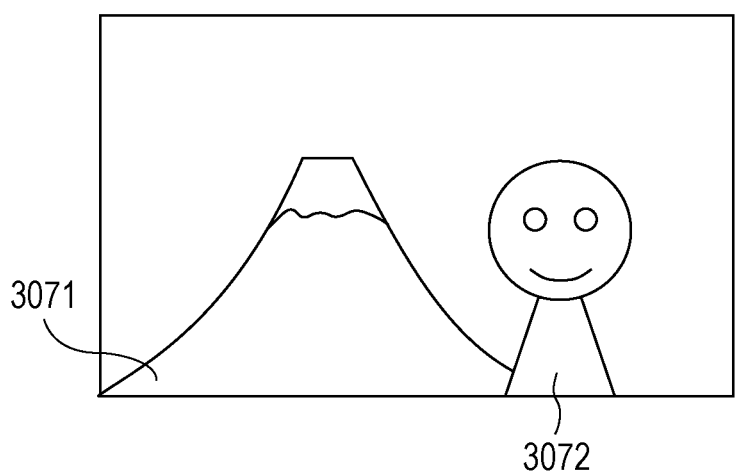
FIG. 25 illustrates an example of image information G3i input into the image processing apparatus in the seventh embodiment.

The image information G3i and the depth information D3, which are input into the image processing apparatus 3100, will now be described with reference to FIG. 25 and FIG. 26. FIG. 25 illustrates an example of the image information G3i input into the image processing apparatus 3100 in the seventh embodiment. An image region 3072 of an object B3 in the short-distance view and an image region 3071 of an object A3 on the far side with respect to the object B3 are illustrated in FIG. 25.

Figure 26:
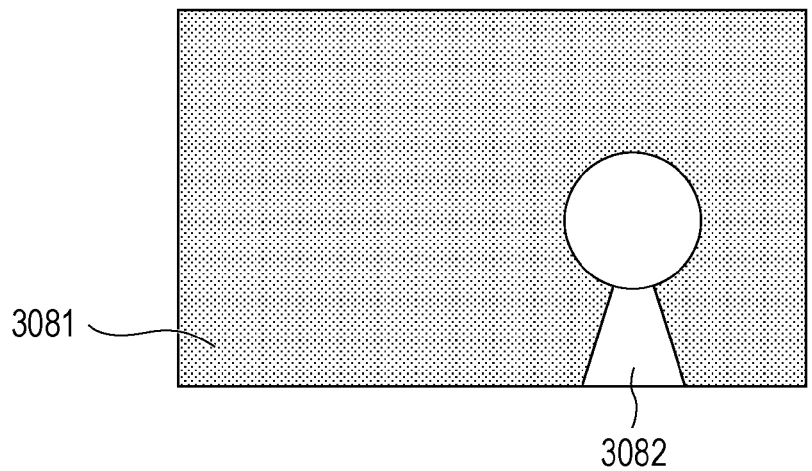
FIG. 26 illustrates an example of the depth information D3 corresponding to FIG. 25.

FIG. 26 illustrates an example of the depth information D3 corresponding to FIG. 25. The depth information is represented with grayscales from white to black at the respective pixels in FIG. 26 and the depth information has a lower value as the grayscale is closer to white. Depth information (the depth information about the object A3) 3081 corresponding to the image region of the object A3 and depth information (the depth information about the object B3) 3082 corresponding to the image region of the object B3 are illustrated in FIG. 26. The depth information 3082 about the object B3 has a value lower than that of the depth information 3081 about the object A3 in FIG. 26. This means that the object B3 is on the nearer side with respect to the object A3.

When the scene illustrated in FIG. 25 is input as the image information and the corresponding depth information is input as the depth information in FIG. 26, the main object is the object B3 arranged in the short-distance view and, for example, the object A3 arranged in the long-distance view is on the background. Since the contour of the object in the long-distance view is made blurred due to the scattering of light and the like, the strength of the contour enhancement is preferably increased with the increasing distance to the object in the processing in the image processor 3102. In addition, since the image of the object B3 in the short-distance view is clearly captured, an increase in the strength of the contour enhancement causes the sense of noise to be distinguished to degrade the image quality.

Accordingly, the image processor 3102 enhances the contour of, for example, the image information G3i on the basis of the image processing intensity S3 determined by the image processing intensity determiner 3101. Specifically, the image processor 3102 performs the contour enhancement process so that the contour of the image information G3i is more strongly enhanced with the increasing image processing intensity S3. The contour enhancement process is, for example, a process to convert the brightness value so that the difference in the brightness value between adjacent pixels is increased. The contour is more strongly enhanced with the increasing difference in the brightness value. The above processing is realized with the spatial filter considering four or eight neighboring pixels. For example, when the object pixel having a pixel value P30 and the four neighboring pixels having pixel values P31, P32, P33, and P34 are considered, a pixel value P3 after the image processing is capable of being calculated from $P3=P30+(P30\times4-P31-P32-P33-P34)\times S3$. In this equation, S3 denotes the image processing intensity calculated by the image processing intensity determiner 3101.

The image processor 3102 is capable of more strongly enhancing the contour of the image information G3i with the increasing image processing intensity S3 in the above manner to generate the clear image. As a result, the image processing apparatus 3100 makes the long-distance view of the image clear to cause the user who watches the image to easily feel the sense of distance with the short-distance view, thereby improving the sense of depth of the image. As a result, the image processing apparatus 3100 is capable of causing the user to feel the depth.

Since the image processing apparatus 3100 is capable of setting the range of the depth information D3 in which the image processing intensity S3 is varied on the basis of the frequency distribution of the depth information D3 (particularly, by setting a threshold value in the frequency distribution of the depth information D3) to vary the image processing intensity in the set range of the depth information D3, it is possible to appropriately enhance the sense of depth of the image.

In addition, the contrast is also reduced due to the scattering of light and the like in the long-distance view. Accordingly, the contrast correction may be performed, in which the contrast is enhanced with, for example, the tone curve in the processing in the image processor 3102. Since the image of the object B3 in the short-distance view is captured with a sufficient contrast and at a sufficient grayscale, excessive contrast correction causes a decrease in the number of grayscales to degrade the image quality.

Accordingly, the image processor 3102 may perform the contrast correction process so that the contrast of the image information G3i is increased with the increasing image processing intensity S3. The contrast correction process is, for example, a process in which the contrast is corrected so that the brightness value is increased when the brightness value is high and the contrast is corrected so that the brightness value is decreased when the brightness value is low. Here, the stronger contrast correction process is performed with the increasing amount of correction. The above processing is realized with the LUT in which the corrected values are defined for the values that are input.

The image processor 3102 is capable of generating the image having the improved sense of contrast in the above manner. As a result, the image processing apparatus 3100 makes the long-distance view of the image clear to improve the sense of depth of the image. As a result, the image processing apparatus 3100 is capable of causing the user who watches the image to easily feel the sense of distance with the short-distance view to cause the user to feel the depth.

An image is preferred to have higher color saturation because of the colors that are stored and clearness and such an image is close to the actual object. However, for example, the skins of persons are required to have flesh color and excessive color saturation enhancement causes the feeling of strangeness to degrade the image quality. Accordingly, the image processor 3102 may perform the color saturation correction to the image information G3i on the basis of the image processing intensity S3 determined by the image processing intensity determiner 3101.

The color saturation correction process is realized by multiplication or addition of the color saturation in the HSV space or by linear conversion of the pixel value that is input with a matrix. The image processor 3102 is capable of varying the color saturation on the basis of the depth information D3 in the above manner. As a result, the image processor 3102 is capable of enhancing the color saturation in the long-distance view of the image to generate the image having the increased color saturation with no feeling of strangeness.

Since the image processing apparatus 3100 increases the color saturation in the long-distance view of the image to make the long-distance view clear in the above manner and causes the user to easily feel the sense of distance with the short-distance view, it is possible to improve the sense of depth of the image. As a result, the image processing apparatus 3100 is capable of causing the user who watches the image to feel the depth.

Figure 27:
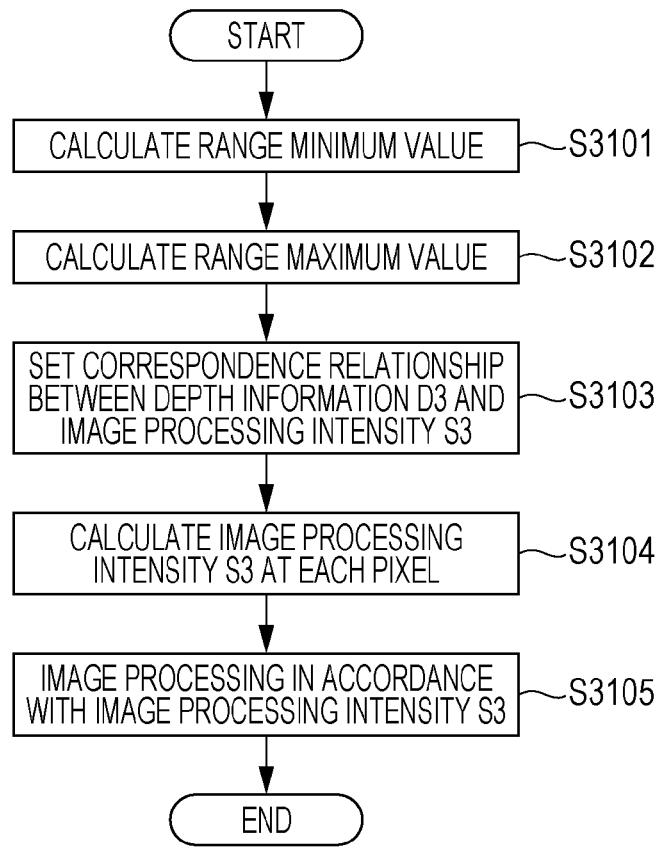
FIG. 27 is a flowchart illustrating an exemplary process in the image processing apparatus in the seventh embodiment.

FIG. 27 is a flowchart illustrating an exemplary process in the image processing apparatus 3100 in the seventh embodiment. First, the depth information analysis module 3103 calculates the range minimum value D3min from the image information G3i (Step S3101). Next, the depth information analysis module 3103 calculates the range maximum value D3max from the image information G3i (Step S3102). Next, the image processing intensity determiner 3101 sets the correspondence relationship between the depth information D3 and the image processing intensity S3 on the basis of the range minimum value D3min and the range maximum value D3max (Step S3103).

Next, the image processing intensity determiner 3101 applies the depth information D3 at each pixel to the set correspondence relationship to calculate the image processing intensity S3 at the pixel (Step S3104). Next, the image processor 3102 performs the image processing to the image information G3i about each pixel on the basis of the image processing intensity S3 at the pixel determined by the image processing intensity determiner 3101 (Step S3105). Then, the process in the flowchart is terminated.

The image processing intensity determiner 3101 is capable of determining the image processing intensity S3 in accordance with the depth information D3 in the range of the depth information D3 in the image information G3i in the above manner. Since the image processor 3102 performs the image processing for all the image regions included in the image information at the image processing intensity S3 corresponding to the depth information D3, it is possible to make the long-distance view clear. As a result, the image processing apparatus 3100 is capable of causing the user who watches the image to easily feel the sense of distance with the short-distance view to cause the user to feel the depth.

<First Modification>

The image processing intensity determiner 3101 may determine the image processing intensity S3 using the depth information D3 about the main object on the foreground. The image information G3i is an image around the main object and the image processing is performed for the difference in the depth information D3 from the main object to enable the image processing to enhance the main object.

Figure 28:
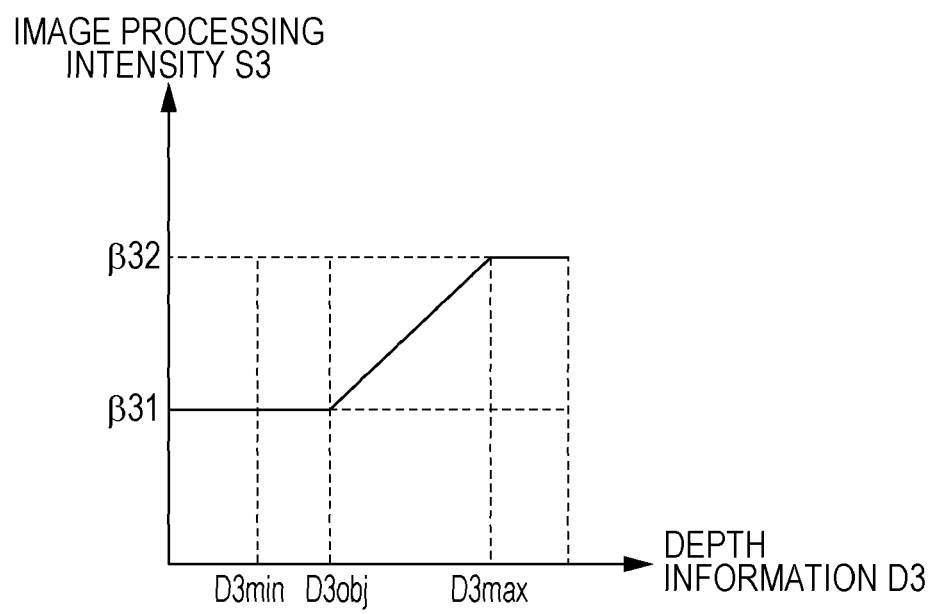
FIG. 28 is a graph illustrating an example of how to set the image processing intensity for the depth information when the image processing intensity is set for an object on the deeper side with respect to a main object.

FIG. 28 is a graph illustrating an example of how to set the image processing intensity for the depth information when the image processing intensity is set for an object on the deeper side with respect to the main object. The horizontal axis represents the depth information D3 and the vertical axis represents the image processing intensity S3 in FIG. 28. D3min represents the range minimum value and D3max represents the range maximum value in FIG. 28. FIG. 28 indicates that the image processing intensity S3 is equal to $\beta 31$ at the depth information D3obj about the main object and the image processing intensity S3 is equal to $\beta 32$ at the range maximum value D3max. The characteristics in which the image processing intensity S3 is linearly increased with the increasing value of the depth information in the range from the depth information D3obj about the main object to the range maximum value D3max are illustrated in FIG. 28.

The depth information analysis module 3103 extracts the depth information D3obj about the main object and the maximum value D3max of the depth information from the frequency distribution of the depth information D3 to supply the depth information D3obj about the main object and the maximum value D3max of the depth information, which are extracted, to the image processing intensity determiner 3101.

When the image processing intensity S3 is varied between β31 and β32 for the image processing, the image processing intensity determiner 3101 sets the image processing intensity S3 so that the image processing intensity S3 is equal to β31 when the depth information D3 is at the depth information D3obj about the main object and is equal to β32 when the depth information D3 is at the range maximum value D3max and contiguously sets the image processing intensity S3 for the depth information D3 between the depth information D3obj and the range maximum value D3max.

Specifically, the depth information analysis module 3103 extracts the depth information D3 corresponding to the first depth information and the second depth information from the frequency distribution of the depth information D3. In a first modification, the second depth information is the range maximum value. In addition, for example, the first depth information is the depth information about the main object. The image processing intensity determiner 3101 determines the image processing intensity so that the image processing intensity is maximized at the second depth information, the image processing intensity is minimized at the first depth information, and the image processing intensity is increased with the increasing depth information.

The image processing intensity determiner 3101 allocates the image processing intensity corresponding to the depth information D3obj about the main object in the image information in the above manner. Accordingly, since the image processor 3102 is capable of perfuming the image processing at the image processing intensity corresponding to the depth information for the image region of an object on the deeper side with respect to the main object, it is possible to cause the user to feel the depth.

When the main object is a person, the depth information analysis module 3103 may combine a face recognition technology to acquire the depth information D3obj about the main object. For example, when a face is detected by the face recognition, the depth information D3 corresponding to the region of the detected face is used as the depth information D3obj about the main object. Here, the depth information analysis module 3103 uses an average value in a certain region as the depth information D3 corresponding to the region of the detected face. The depth information analysis module 3103 is capable of calculating the average value in the above manner to reduce the effect of, for example, noise included in the depth information D3.

<Second Modification>

The image processing intensity determiner 3101 may increase the image processing intensity S3 toward the range maximum value D3max from the depth information D3 between the depth information D3obj about the main object and the maximum value D3max of the depth information. The main object, such as a person or an animal, has a thickness. Accordingly, the depth information D3obj about the main object calculated in the depth information analysis module 3103 is any of the pieces of depth information D3 corresponding to the respective pixels included the image region of the main object.

Consequently, in order to start the image processing from an object on the deeper side with respect to the main object, the image processing intensity determiner 3101 may increase the image processing intensity S3 toward the range maximum value D3max from the depth information D3 the value of which is higher than that of the calculated depth information D3obj about the main object by a predetermined value. In this case, for example, the image processing intensity determiner 3101 may determine the image processing intensity S3 using a relationship between the depth information D3 and the image processing intensity S3 illustrated in FIG. 29.

Figure 29:
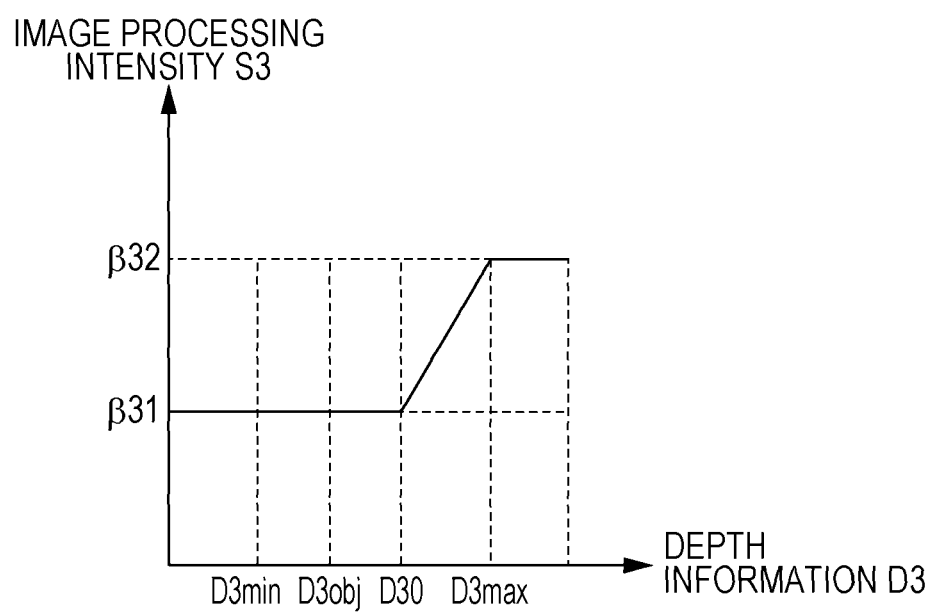
FIG. 29 is a graph illustrating another example of how to set the image processing intensity for the depth information when the image processing intensity is set for an object on the deeper side with respect to the main object.

FIG. 29 illustrates an example of how to set the image processing intensity for the depth information when the image processing intensity is set for an object on the deeper side with respect to the main object. The horizontal axis represents the depth information D3 and the vertical axis represents the image processing intensity S3 in FIG. 29. D3min represents the range minimum value, D3max represents the range maximum value, and D30 represents depth information (hereinafter referred to as intermediate depth information) positioned between the depth information D3obj about the main object and the maximum value D3max of the depth information in FIG. 29. FIG. 29 indicates that the image processing intensity S3 is equal to β31 at the intermediate depth information D30 and the image processing intensity S3 is equal to β32 at the range maximum value D3max. The characteristics in which the image processing intensity S3 is linearly increased with the increasing value of the depth information D3 in the range from the intermediate depth information D30 to the range maximum value D3max are illustrated in FIG. 29.

The depth information analysis module 3103 calculates the range maximum value D3max and the intermediate depth information D30.

Specifically, for example, the depth information analysis module 3103 adds a certain value to the depth information D3obj about the main object to calculate the intermediate depth information D30. The depth information analysis module 3103 supplies the range maximum value D3max and the intermediate depth information D30, which are calculated, to the image processing intensity determiner 3101.

The depth information analysis module 3103 may calculate the intermediate depth information D30 by, for example, multiplying the depth information D3obj about the main object by a certain value, calculating the average value of the depth information D3obj about the main object and the range maximum value D3max, or mixing the depth information D3obj about the main object with the range maximum value D3max at a predetermined ratio.

When the image processing intensity S3 is varied between β31 and β32 for the image processing, the image processing intensity determiner 3101 sets the image processing intensity S3 so that the image processing intensity S3 is equal to β31 at the intermediate depth information D30 and is equal to β32 at the range maximum value D3max and contiguously sets the image processing intensity S3 for the depth information D3 between the intermediate depth information D30 and the range maximum value D3max.

Specifically, the depth information analysis module 3103 extracts the depth information D3 corresponding to the first depth information and the second depth information from the frequency distribution of the depth information D3. In a second modification, the second depth information is the range maximum value D3max and the first depth information is the intermediate depth information D30. The image processing intensity determiner 3101 determines the image processing intensity S3 so that the image processing intensity S3 is maximized at the second depth information, the image processing intensity S3 is minimized at the first depth information, and the image processing intensity S3 is increased with the increasing depth information D3 in the range between the first depth information and the second depth information.

Accordingly, since the image processor 3102 is capable of performing the image processing at the image processing intensity S3 corresponding to the depth information D3 for the image region corresponding to an object on the deeper side with respect to the main object, it is possible to cause the user to feel the depth.

The image processing intensity determiner 3101 may select the characteristics in FIG. 23, the characteristics in FIG. 24 (the characteristics of the present embodiment), the characteristics in FIG. 28 (the characteristics in the first modification), or the characteristics in FIG. 29 (the characteristics in the second modification), which are described above, depending on the scene. For example, the image processing intensity determiner 3101 may determine the image processing intensity S3 using the characteristics in FIG. 23, for example, when no object exists in the short-distance view or no person exists as the object. In addition, the image processing intensity determiner 3101 may use the characteristics in FIG. 29 when an object in the short-distance view exists or a person exists as the object. Furthermore, the image processing intensity determiner 3101 may constantly set the image processing intensity S3 to a predetermined value regardless of the depth information D3 when the parallax range is deflected to one side (for example, when the image exists only in the short-distance view or in the long-distance view). Since the image processing apparatus 3100 switches the method of determining the image processing intensity S3 depending on the scene in the above manner, it is possible to perform the appropriate image processing corresponding to the scene.

Although the image processing of the image information G3i corresponding to one image is described above in the embodiment of the image processing apparatus 3100, the image processing is applicable also to a movie and similar effects are achieved when the image processing is applied to the movie. In the processing of the movie, the image processing intensity determiner 3101 also considers the result of a frame temporally previous to the analysis target frame for the result of the calculation in the depth information analysis module 3103.

For example, the following case will be described when the range maximum value is equal to D3max1, the range minimum value is equal to D3min1, and the depth information about the main object is equal to D3obj1 as the result of the analysis of the depth information D3 in a certain target frame by the depth information analysis module 3103. The following case is a case in which the range maximum value is equal to D3max0, the range minimum value is equal to D3min0, and the depth information about the main object is equal to D3obj0 as the result of the analysis of the depth information D3 in a frame immediately before the target frame by the depth information analysis module 3103.

In the above case, the depth information analysis module 3103 calculates the range maximum value to be finally output from (D3max1+D3max0)/2, calculates the range minimum value to be finally output from (D3min1+D3min0)/2, and calculates the depth information about the main object to be finally output from (D3obj1+D3obj0)/2. Then, the depth information analysis module 3103 supplies the calculated respective parameters to the image processing intensity determiner 3101. Accordingly, the image processing intensity determiner 3101 is capable of reducing the variation of the respective parameters between the frames due to the noise included in the depth information D3 to reduce flicker of the image indicated by the output image information G3o.

Each parameter is not limitedly calculated using the average value and the depth information analysis module 3103 may use a median or may calculate different parameters using different calculation methods. Specifically, for example, the depth information analysis module 3103 may calculate the range minimum value to be finally output as the average value of the range minimum value of the target frame and the range minimum value of a frame immediately before the target frame and may calculate the depth information about the main object to be finally output as the median of the depth information about the main object in the target frame and the depth information about the main object in a frame immediately before the target frame.

The frame used in the calculation of the average value with each parameter of the target frame is not limited to the frame immediately before the target frame and may be a frame multiple frames before the target frame or may be a frame after the target frame as long as the frame is different from the target frame. Although the depth information analysis module 3103 calculates the average value of the two frames, the calculation of the average value is not limited to this and the depth information analysis module 3103 may calculate the average value of three or more frames. When the scene is not greatly varied between the frames, inclusion of several frames immediately before the target frame in the result of the analysis of the target frame allows delay in the image processing to be reduced.

Specifically, the depth information analysis module 3103 calculates the information concerning the frequency distribution of the depth information in the target frame and the information concerning the frequency distribution of the depth information in at least one frame before the target frame. The information about the frequency distribution is information calculated from the frequency distribution and, for example, is the range minimum value, the range maximum value, the depth information about the main object, or the intermediate depth information. The image processing intensity determiner 3101 may determine the image processing intensity at each pixel in the image information on the basis of the frequency distributions of multiple pieces of depth information calculated by the depth information analysis module 3103.

The depth information analysis module 3103 may determine that the scene is varied if, for example, the average luminance, the contour strength, or the color distribution in the image information is greatly varied. In this case, the depth information analysis module 3103 may calculate each parameter only using the result of the calculation for the target frame, without using the result of the calculation of the previous frame. Since the image processing apparatus 3100 does not refer to the parameters of the previous frame when the scene is varied, the image processing apparatus 3100 is capable of performing the image processing at the image processing intensity S3 corresponding to the depth information D3 on the current scene without being affected by the parameters of the previous scene.

As described above, the image processing apparatus 3100 of the present embodiment extracts the first depth information from which the image processing intensity is varied from the frequency distribution of the depth information D3. The image processing apparatus 3100 determines the image processing intensity S3 at each pixel so that the image processing intensity S3 is increased from the extracted first depth information toward the range maximum value. The image processing apparatus 3100 performs predetermined image processing for each pixel at the image processing intensity S3 determined for the pixel. Accordingly, the image processing apparatus 3100 is capable of varying the image processing intensity S3 in the appropriate range of the depth information D3 to make the image region in the long-distance view clear, thereby generating the high-quality image having the improved sense of depth. Accordingly, the image processing apparatus 3100 is capable of generating the image for which the use feels the depth.

Considering the pixel position where the image processing is performed in the determination of the image processing intensity S3 allows the image having the improved sense of depth to be generated also in the long-distance view.

Eighth Embodiment

Figure 30:
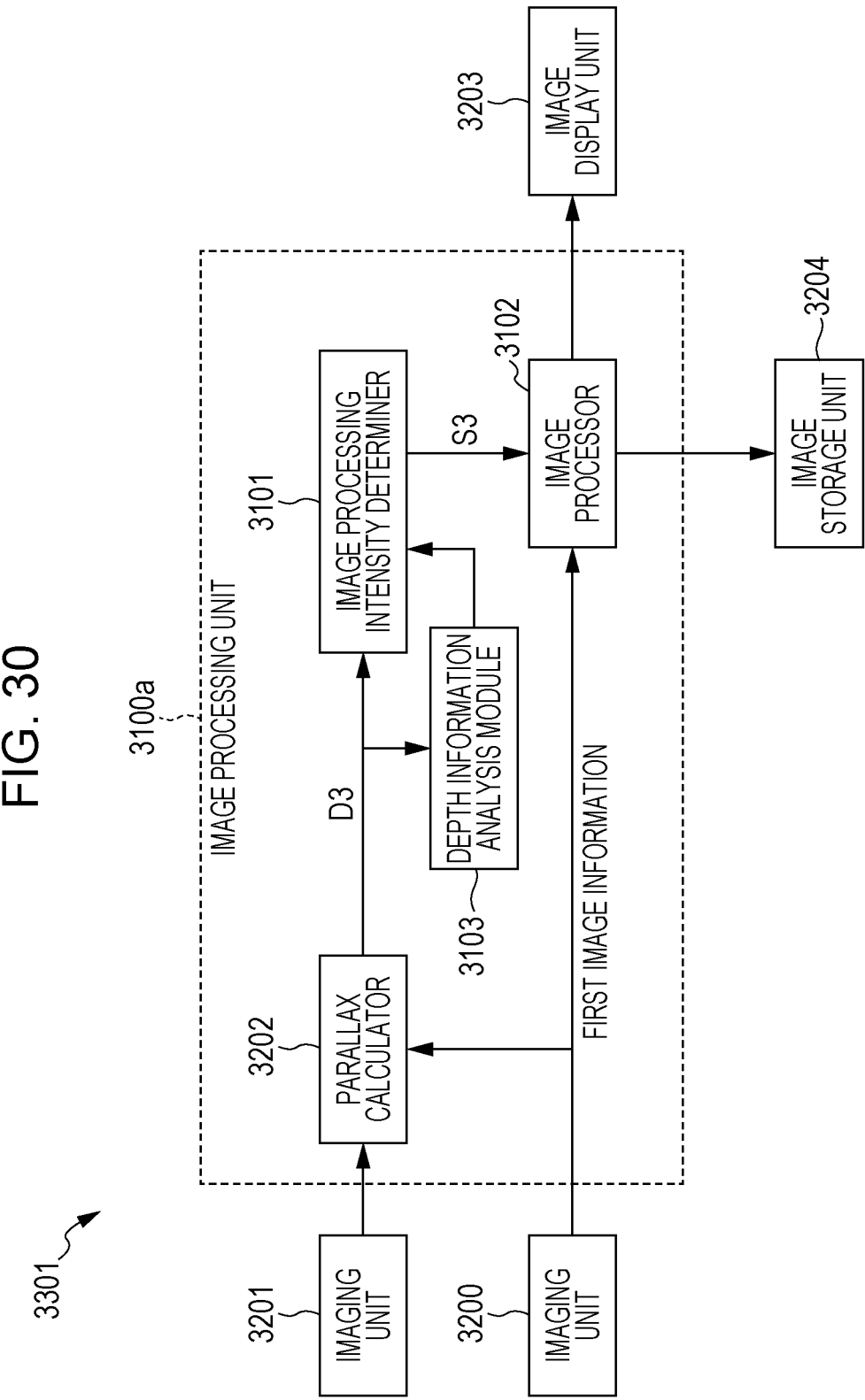
FIG. 30 is a schematic block diagram of an image capturing apparatus in an eighth embodiment.

FIG. 30 is a schematic block diagram of an image capturing apparatus 3301 in an eighth embodiment. The same reference numerals are used in FIG. 30 to identify the same components illustrated in FIG. 20. A specific description of such components is omitted herein. The image capturing apparatus 3301 includes an imaging unit 3200, an imaging unit 3201, an image processing unit 3100a, an image display unit 3203, and an image storage unit 3204. The configuration of the image processing unit 3100a in FIG. 30 results from addition of a parallax calculator 3202 to the configuration of the image processing apparatus 3100 in the seventh embodiment in FIG. 20.

The two imaging units: the imaging unit 3200 and the imaging unit 3201 are arranged in parallel with each other. The imaging units 3200 and 3201 are each composed of a lens module and an image sensor, such as a charge coupled device (CCD) or a complementary metal oxide semiconductor (CMOS).

The imaging unit 3200 captures an image of an object to supply first image information acquired through the image capturing to the parallax calculator 3202. Similarly, the imaging unit 3201 captures an image of the object to supply second image information acquired through the image capturing to the parallax calculator 3202.

The parallax calculator 3202 calculates the parallax corresponding to each pixel in an input image on the basis of the input image and an image the parallax of which is different from that of the input image to determine the depth information D3 on the basis of the calculated parallax.

The parallax is the amount of shift between the objects in the two images. Specifically, for example, the parallax calculator 3202 calculates the parallax value corresponding to each pixel in the first image information through the block matching using the first image information supplied from the imaging unit 3200 and the second image information supplied from the imaging unit 3201.

The relationship between a distance Z to the object an image of which is captured and a parallax d is $d = f \times B / Z$. In the above expression, f denotes a focal length of the imaging unit 3200 and the imaging unit 3201 and B denotes a base line length, which is the distance between the imaging unit 3200 and the imaging unit 3201. The correlation is established between the distance Z and the parallax d from the relational expression of the distance Z and the parallax d described above. In the present embodiment, the image processing unit 3100a calculates the depth information D3 on the basis of the parallax d.

Figure 31:
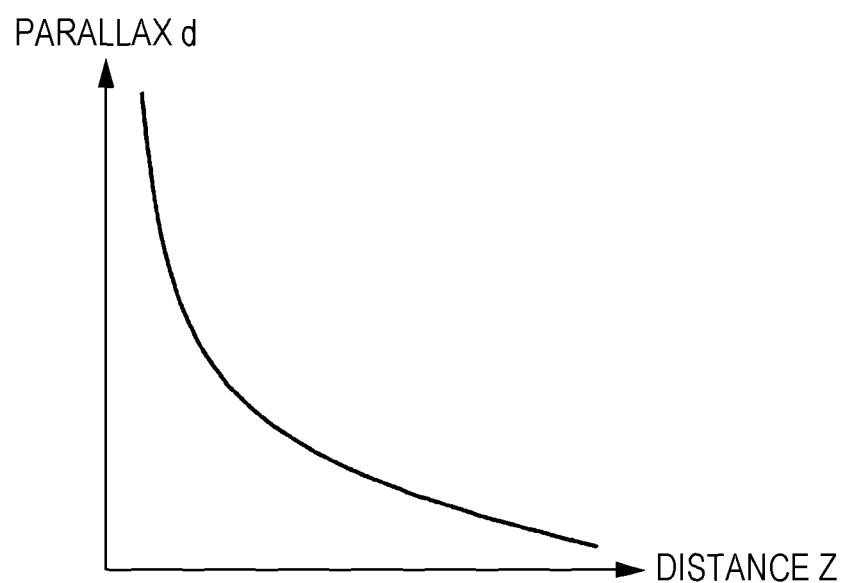
FIG. 31 is a graph illustrating the relationship between the distance Z and the parallax d.

FIG. 31 is a graph illustrating the relationship between the distance Z and the parallax d. As illustrated in FIG. 31, the distance Z is inversely proportional to the parallax d and a linear relationship is not established between the distance Z and the parallax d. Accordingly, the parallax calculator 3202 converts the parallax d so as to establish the linear relationship with the distance and uses the value resulting from the conversion as the depth information D3. Specifically, for example, the parallax calculator 3202 calculates a reciprocal of the calculated parallax d (1/d) and uses the reciprocal of the calculated parallax d as the depth information D3. The parallax calculator 3202 supplies the calculated depth information D3 to the image processing intensity determiner 3101.

The conversion of the parallax may not necessarily result in a completely linear relationship with the distance and may result in a substantially linear relationship.

The parallax calculator 3202 may directly use the calculated parallax d as the depth information D3. In this case, the depth information D3 is decreased with the increasing distance to the object and is increased with the decreasing distance to the object. Accordingly, the image processing intensity determiner 3101 may increase the image processing intensity S3 with the decreasing value of the depth information D3. Accordingly, the image processing intensity determiner 3101 is capable of increasing the image processing intensity S3 with the deeper side which the depth information D3 indicates.

The image processing intensity determiner 3101 determines the image processing intensity S3 on the basis of the depth information D3 supplied from the parallax calculator 3202. The image processor 3102 performs the image processing to the first image information supplied from the imaging unit 3200 at the image processing intensity S3 determined by the image processing intensity determiner 3101. The image processor 3102 causes the image display unit 3203 to display the output image information G3o resulting from the image processing and causes the image storage unit 3204 to store the output image information G3o resulting from the image processing.

As described above, the image capturing apparatus 3301 of the present embodiment extracts the first depth information from which the image processing intensity S3 is varied from the frequency distribution of the depth information D3. Then, the image capturing apparatus 3301 determines the image processing intensity S3 at each pixel so that the image processing intensity is increased from the extracted first depth information toward the range maximum value D3max. Accordingly, the image capturing apparatus 3301 is capable of varying the image processing intensity S3 in the appropriate range of the depth information D3 to make the image region in the long-distance view clear, thereby generating the high-quality image having the improved sense of depth.

As a result, the image capturing apparatus 3301 is capable of generating the image for which the user feels the depth.

Since the image processing apparatus 3100 is capable of setting the range of the depth information D3 in which the image processing intensity S3 is varied on the basis of the frequency distribution of the depth information D3 (particularly, by setting a threshold value in the frequency distribution of the depth information D3) to vary the image processing intensity in the set range of the depth information D3, it is possible to appropriately enhance the sense of depth of the image.

Although the image capturing apparatus 3301 including the two imaging units is described in the present embodiment, similar effects can be achieved using a method of calculating the parallax information from multiple images. For example, this can be realized by performing second image capturing at a point horizontally shifted from a first image capturing point. A depth information calculator described below may be provided, instead of the parallax calculator 3202.

Ninth Embodiment

Figure 32:
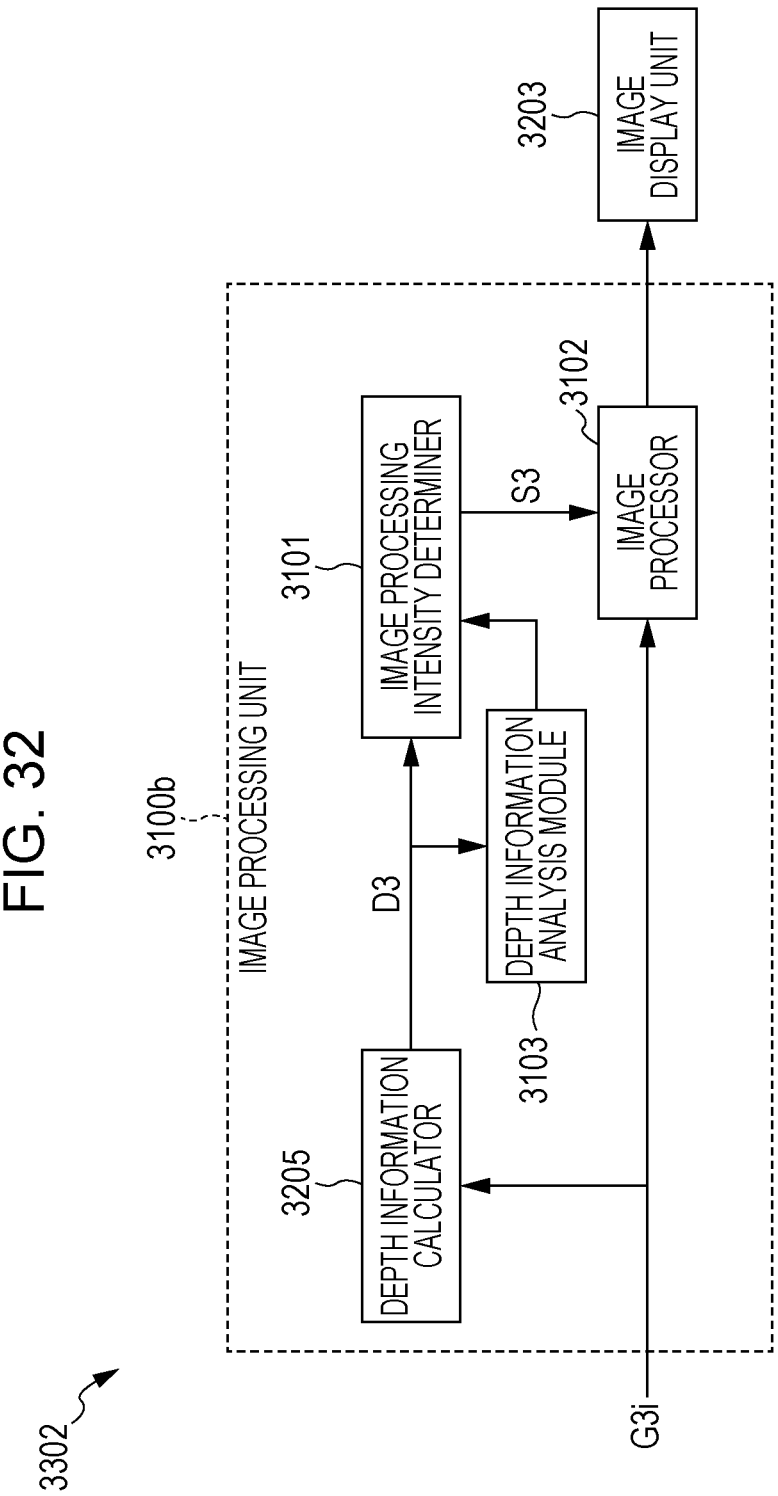
FIG. 32 is a schematic block diagram of a display apparatus in a ninth embodiment.
Figure 33:
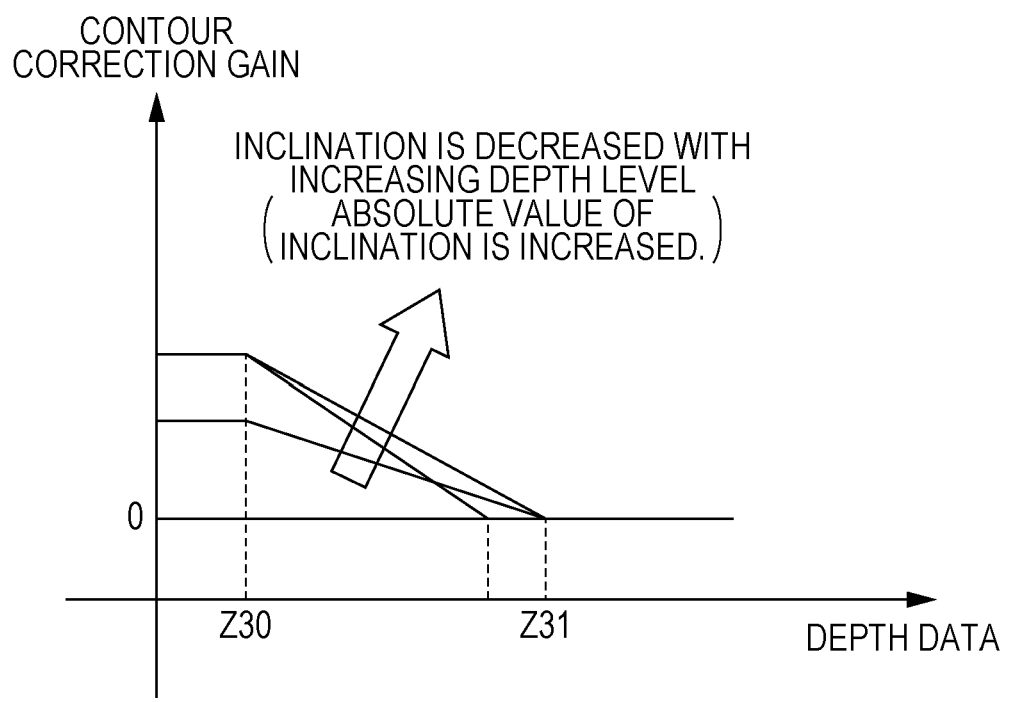
FIG. 33 is a graph illustrating the relationship between depth data and contour correction gain in PTL 1.

FIG. 32 is a schematic block diagram of a display apparatus 3302 in a ninth embodiment. The same reference numerals are used in FIG. 32 to identify the same components illustrated in FIG. 20. A specific description of such components is omitted herein. The display apparatus 3302 includes an image processing unit 3100b and the image display unit 3203. The configuration of the image processing unit 3100b in FIG. 32 results from addition of a depth information calculator 3205 to the configuration of the image processing apparatus 3100 in the seventh embodiment in FIG. 20.

The depth information calculator 3205 estimates the depth information D3 from the image information G3i supplied from the outside of the display apparatus. Various estimation methods in the related art can be used for the estimation of the depth information D3.

For example, the depth information calculator 3205 generates a three-dimensional image from a two-dimensional image through, for example, color information, vanishing point analysis, region splitting, or object extraction to generate the depth information D3.

The depth information calculator 3205 supplies the estimated depth information D3 to the image processing intensity determiner 3101.

Although the image processor 3102 has functions similar to those of the image processor 3102 of the seventh embodiment, the image processor 3102 differs from the image processor 3102 of the seventh embodiment in the following points. The image processor 3102 causes the image display unit 3203 to display an output image resulting from the image processing.

Accordingly, the display apparatus 3302 is capable of varying the image processing intensity S3 in the appropriate range of the depth information D3 to make the image region in the long-distance view clear, thereby generating the high-quality image having the improved sense of depth. As a result, the display apparatus 3302 is capable of displaying the image for which the user feels the depth.

Although the display apparatus 3302 including the depth information calculator 3205 is described in the present embodiment, the parallax may be calculated from a stereoscopic image and the depth information D3 may be calculated on the basis of the parallax to determine the image processing intensity S3 on the basis of the calculated depth information D3 when the image information including information about the stereoscopic image and the like is input. Also in this case, the display apparatus 3302 is capable of achieving effects similar to the above ones. When the depth information D3 is input into the display apparatus 3302 along with the image information, the depth information D3 may be directly supplied to the image processing intensity determiner 3101 in the display apparatus 3302.

A program to realize any or part of the functions of the image processing apparatus 1100 in FIG. 1, the image processing unit 1100a in FIG. 6, the image processing unit 1100b in FIG. 8, the image processing apparatus 2100 in FIG. 9, the image processing unit 2100a in FIG. 17, the image processing unit 2100b in FIG. 19, the image processing apparatus 3100 in FIG. 20, the image processing unit 3100a in FIG. 30, and the image processing unit 3100b in FIG. 32 may be recorded on a computer-readable recording medium, and the program recorded on the recording medium may be realized by a computer system that reads out and executes the program or may be realized by dedicated hardware. The "computer system" here includes the hardware, such as an operating system (OS) and peripheral devices.

The "computer-readable recording medium" means a portable medium, such as a flexible disk, a magneto-optical disk, a read only memory (ROM), or a compact disk-read only memory (CD-ROM), or a storage apparatus, such as a hard disk, incorporated in the computer system. In addition, the "computer-readable recording medium" includes a medium that dynamically holds the program for a short time, such as a communication line when the program is transmitted via a network such as the Internet or a communication network such as a telephone line and a medium that holds the program for a certain time period, such as a volatile memory in the computer system serving as a server or a client in the above case. The above-described program may be used for realizing part of the functions described above or the functions described above may be realized by a combination of a program that has been recorded in the computer system.

While the embodiments of the present invention have been described with reference to the drawings, the specific configurations are not limited to these embodiments and design changes and modified embodiments will be included without departing from the true spirit and scope of the invention.

INDUSTRIAL APPLICABILITY

The present invention is applicable to an image processing apparatus, an image capturing apparatus, a display apparatus, and so on, which generate an image having an improved sense of depth also in the long-distance view.

REFERENCE SIGNS LIST 1110 image processing apparatus
1100a, 1100b image processing unit
1101 image processing intensity determiner
1102 image processor
1200, 1201 imaging device
1202 parallax calculator
1203 image display unit
1204 image storage unit
1205 depth information calculator
1300 image capturing apparatus
1301 image display apparatus
2100 image processing apparatus
2100a, 2100b image processing unit
2101 image processing intensity determination module
2102 image processor
2103 vanishing point calculator
2111 determiner
2112 distance calculator
2113 intensity calculator
2200, 2201 imaging unit
2202 parallax calculator
2203 image display unit
2204 image storage unit
2205 depth information calculator
3100 image processing apparatus
3100a, 3100b image processing unit
3101 image processing intensity determiner
3102 image processor
3103 depth information analysis module
3111 frequency distribution calculator
3112 first depth information calculator 3113 second depth information calculator
3200, 3201 imaging unit
3202 parallax calculator
3203 image display unit
3204 image storage unit
3205 depth information calculator

The invention claimed is:

1. An image processing apparatus comprising:
   image processing intensity determination circuitry that determines an intensity of image processing; and
   image processing circuitry that performs the image processing to image information in accordance with the intensity determined by the image processing intensity determination circuitry, wherein
   the image processing intensity determination circuitry determines the intensity of the image processing at a target pixel included in the image information on the basis of a depth value indicating a depth corresponding to the target pixel and a vertical position of the target pixel in the image information, and
   in a case in which the depth value corresponding to the target pixel is saturated, the image processing intensity determination circuitry determines the intensity on the basis of the vertical position.

2. The image processing apparatus according to claim 1, further comprising:
   vanishing point calculation circuitry that calculates a position of a vanishing point from the image information,
   wherein the image processing intensity determination circuitry determines the image processing intensity at an object pixel to be subjected to the image processing on the basis of a distance between the object pixel and the position of the vanishing point calculated by the vanishing point calculation circuitry.

3. The image processing apparatus according to claim 1, further comprising:
   depth information analysis circuitry that extracts information about frequency distribution of depth information corresponding to the image information on the basis of the depth information,
   wherein the image processing intensity determination circuitry determines the image processing intensity at each pixel in the image information on the basis of the information extracted by the depth information analysis circuitry and the depth information.

4. An image capturing apparatus comprising:
   imaging circuitry that captures an image of an object;
   image processing intensity determination circuitry that determines an intensity of image processing; and
   image processing circuitry that performs the image processing to image information generated by the imaging circuitry in accordance with the intensity determined by the image processing intensity determination circuitry,
   wherein the image processing intensity determination circuitry determines the intensity of the image processing at a target pixel included in the image information on the basis of a depth value indicating a depth corresponding to the target pixel and a vertical position of the target pixel in the image information, and
   in a case in which the depth value corresponding to the target pixel is saturated, the image processing intensity determination circuitry determines the intensity on the basis of the vertical position.

5. A display apparatus comprising:
   image processing intensity determination circuitry that determines an intensity of image processing;
   image processing circuitry that performs the image processing to image information in accordance with the intensity determined by the image processing intensity determination circuitry; and
   image display circuitry that displays an image subjected to the image processing in the image processing circuitry, wherein
   the image processing intensity determination circuitry determines the intensity of the image processing at a target pixel included in the image information on the basis of a depth value indicating a depth corresponding to the target pixel and a vertical position of the target pixel in the image information, and
   in a case in which the depth value corresponding to the target pixel is saturated, the image processing intensity determination circuitry determines the intensity on the basis of the vertical position.

* * * * *